United States Patent
Li

(10) Patent No.: US 9,160,439 B2
(45) Date of Patent: Oct. 13, 2015

(54) METHOD, BASE STATION, AND SYSTEM OF CONFIGURING RELAY LINK RESOURCES

(75) Inventor: Zhongfeng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 851 days.

(21) Appl. No.: 13/362,615

(22) Filed: Jan. 31, 2012

(65) Prior Publication Data

US 2012/0127910 A1    May 24, 2012

Related U.S. Application Data

(63) Continuation of application No. PCT/CN2010/075595, filed on Jul. 30, 2010.

(30) Foreign Application Priority Data

Jul. 31, 2009   (CN) .......................... 2009 1 0161850

(51) Int. Cl.
| | |
|---|---|
| *H04L 5/00* | (2006.01) |
| *H04B 7/155* | (2006.01) |
| *H04W 72/04* | (2009.01) |
| *H04W 84/04* | (2009.01) |

(52) U.S. Cl.
CPC .............. *H04B 7/155* (2013.01); *H04L 5/0007* (2013.01); *H04L 5/0053* (2013.01); *H04W 72/04* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 5,822,314 A | 10/1998 | Chater-Lea | |
| 2008/0056172 A1 | 3/2008 | Nakatsugawa | |
| 2008/0057864 A1 | 3/2008 | Jung et al. | |
| 2008/0212516 A1 | 9/2008 | Son et al. | |
| 2010/0008284 A1* | 1/2010 | Chae et al. | 370/315 |
| 2010/0275083 A1* | 10/2010 | Nam et al. | 714/748 |
| 2012/0113889 A1* | 5/2012 | Noh et al. | 370/315 |

FOREIGN PATENT DOCUMENTS

CN             101291473 A        10/2008

OTHER PUBLICATIONS

Extended European Search Report in corresponding European Patent Application No. 10803921.5 (May 18, 2012).

(Continued)

*Primary Examiner* — Christine Duong
(74) *Attorney, Agent, or Firm* — Leydig, Voit & Mayer, Ltd.

(57) ABSTRACT

A method, a base station, and a system of configuring relay link resources are provided. The method of configuring relay link resources includes: receiving an orthogonal frequency division multiplexing OFDM symbol number reported by a relay node RN, in which the OFDM symbol is used by a physical downlink control channel PDCCH of a multimedia multicast broadcast single frequency network MBSFN subframe where a relay link of the RN is located; and configuring relay link resources according to the OFDM symbol number, an offset, and a length of a PDCCH in an eNB subframe, in which the offset is an offset of an RN frame relative to the time when the RN frame is initially synchronized with an eNB frame, and is smaller than a sum of a length of the PDCCH of the MBSFN subframe where the relay link of the RN is located and a first idle time.

15 Claims, 10 Drawing Sheets

(56) References Cited

OTHER PUBLICATIONS

"R1-092468—Control Channel of Backhaul Link," 3GPP Draft, 3GPP TSG-RAN WG1 #57bis, Jun. 29, 2009, $3^{rd}$ Generation Partnership Project, Valbonne, France.

"R1-092660—Some Considerations on Downlink Backhaul Control Design in Type I Relay," 3GPP Draft, 3GPP TSG-RAN WG1 #57bis, Jun. 29, 2009, $3^{rd}$ Generation Partnership Project, Valbonne, France.

"R1-091763—Control Channel for Relay Backhaul Link," 3GPP Draft, 3GPP TSG-RAN WG1 #57s, May 4, 2009, $3^{rd}$ Generation Partnership Project, Valbonne, France.

Written Opinion of the International Searching Authority in corresponding PCT Application No. PCT/CN2010/075595 (Nov. 11, 2010).

"R1-091871—Discussion on Backhaul Control Design for Type-I L3 Relay," 3GPP TSG RAN WG1 Meeting #57, May 4-8, 2009, 3rd Generation Partnership Project, San Francisco, California.

International Search Report in corresponding PCT Application No. PCT/CN2010/075595 (Nov. 11, 2010).

* cited by examiner

METHOD, BASE STATION, AND SYSTEM OF CONFIGURING RELAY LINK RESOURCES

CROSS-REFERENCE TO RELATED APPLICATIONS

This application is a continuation of International Application No. PCT/CN2010/075595, filed on Jul. 30, 2010, which claims priority to Chinese Patent Application No. 200910161850.9, filed on Jul. 31, 2009, both of which are hereby incorporated by reference in their entireties.

FIELD OF THE INVENTION

The present invention relates to the field of communications technologies, and in particular, to a method, a base station, and a system of configuring relay link resources.

BACKGROUND OF THE INVENTION

With the development of wireless communications technologies, there are higher requirements for communication rate and communication quality. After a relay node (RN, Relay Node) is introduced into the $3^{rd}$ Generation Partnership Project (3GPP, $3^{rd}$ Generation Partnership Project) Long Term Evolution Advanced (LTE-Advanced, Long Term Evolution Advanced) standard, the problem is effectively solved by using the RN to perform backhaul transmission, and the RN can expand cell coverage, improve cell capacity, and make cell throughput uniform.

When an RN is used as a network node to perform cell coverage, the RN communicates with a base station (eNB, Evolved Node Base station) and a user equipment (UE, User Equipment) under the coverage of the RN in a time division mode. To ensure that a UE in the 3GPP Release-8 (Release-8) standard is not affected when accessing a network, a subframe where a communication link between the RN and the eNB, that is, a relay link, is located is configured as a multimedia multicast broadcast single frequency network (MBSFN, Multimedia Broadcast multicast service Single Frequency Network) subframe, the first 1-2 orthogonal frequency division multiplexing (Orthogonal Frequency Division Multiplexing, OFDM) symbols of the MBSFN subframe are used for the RN to communicate with the UE under the coverage of the RN, while the remaining OFDM symbols may be used for the RN to communicate with the eNB.

However, while the eNB sends a physical downlink control channel (PDCCH, Physical Downlink Control Channel) (1-4 OFDM symbols) to the UE under the coverage of the eNB, the RN also sends a physical downlink control channel PDCCH (1-2 OFDM symbols) at the same time, so the RN cannot receive the PDCCH of the eNB, and the PDCCH of the RN and the PDCCH of the eNB may be of different lengths, which will affect the time when the eNB is capable of sending a PDCCH or a physical downlink shared channel (PDSCH, Physical Downlink Shared Channel) to the RN or the time when the RN is capable of receiving the PDCCH or the PDSCH, thereby affecting resources used on the relay link. In addition, since the RN needs to perform state conversion from a receiving state to a sending state or from a sending state to a receiving state when changing from communicating with the UE under the RN to communicating with the eNB, and the RN cannot receive or send downlink information within the state conversion time, the state conversion time is an idle time/guard time, and the existence of the state conversion time also affects the resources used on the relay link.

In the prior art, to enable the RN to share the PDCCH of the eNB with the UE under the coverage of the eNB, the RN generally offsets an RN frame forward relative to an eNB frame. As shown in FIG. 1, an offset of the RN frame relative to the eNB frame is: the length 1 of a PDCCH of the MBSFN subframe where the relay link of the RN is located+a first idle time 2, in which the idle time 2 includes the state conversion time of the RN. The RN frame will ignore the last several OFDM symbols (equivalent to the offset of the RN frame relative to the eNB frame) of the eNB frame.

The resources used on the relay link (a relay_physical downlink shared channel R_PDSCH) after the RN frame is offset relative to the eNB frame are: the total length of the subframe−the offset of the RN frame relative to the eNB frame−a relay_physical downlink control channel R_PDCCH−a second idle time 3. In this method, since the offset of the RN frame relative to the eNB frame is too large, the relay link resources are reduced. In addition, the eNB considers by default the length of the PDCCH of the MBSFN subframe where the relay link of the RN is located to be a maximum value (2 OFDM symbols), so that the offset of the RN frame relative to the eNB frame is further increased, and the relay link resources are further decreased, thereby wasting the resources.

SUMMARY OF THE INVENTION

Embodiments of the present invention provide a method, a base station, and a system of configuring relay link resources, so as to increase relay link resources.

An embodiment of the present invention provides a method of configuring relay link resources, which includes:

receiving an orthogonal frequency division multiplexing OFDM symbol number reported by a relay node RN, in which the OFDM symbol is used by a physical downlink control channel PDCCH of a multimedia multicast broadcast single frequency network MBSFN subframe where a relay link of the RN is located; and configuring relay link resources according to the OFDM symbol number, an offset, and a length of a PDCCH in a base station eNB subframe, in which the offset is a time offset of timing of an access link of an RN frame relative to timing of a relay link of the RN frame.

An embodiment of the present invention further provides a method of configuring relay link resources, which includes:

receiving, by a relay node RN, relay link information on relay link resources, in which the relay link resources start from an orthogonal frequency division multiplexing OFDM symbol corresponding to start time of the RN actually receiving the relay link information, the OFDM symbol corresponding to the start time of the RN actually receiving the relay link information is a $K^{th}$ OFDM symbol in a base station eNB subframe, the relay link resources include f OFDM symbols, f is the number of symbol included in the eNB subframe−K−N, K is a serial number of an OFDM symbol corresponding to start time of an eNB actually sending the relay link information, and a sum of K and N is smaller than 14.

An embodiment of the present invention provides a base station, which includes:

a receiving module, configured to receive an orthogonal frequency division multiplexing OFDM symbol number reported by a relay node RN, in which the OFDM symbol is used by a physical downlink control channel PDCCH of a multimedia multicast broadcast single frequency network MBSFN subframe where a relay link of the RN is located; and a resource configuration module, configured to configure relay link resources according to the OFDM symbol number, an offset, and a length of a PDCCH in a base station eNB subframe, in which the offset is a time offset of timing of an access link of an RN frame relative to timing of a relay link of the RN frame.

A system of configuring relay link resources includes a relay node and the base station, in which the relay node is configured to perform initial synchronization timing with the base station eNB; and offset an RN frame relative to the time when the RN frame is initially synchronized with an eNB frame, according to an offset of the RN frame relative to the time when the RN frame is initially synchronized with the eNB frame; and report, to the eNB, the orthogonal frequency division multiplexing OFDM symbol number used by a PDCCH of an MBSFN subframe where a relay link of the RN is located.

It can be seen from the technical solutions provided in the embodiments of the present invention that, in the embodiments of the present invention, relay link resources are configured according to an offset of an RN frame relative to the time when the RN frame is initially synchronized with an eNB frame, the OFDM symbol number used by a PDCCH of an MBSFN subframe where a relay link of the RN is located, and the length of a PDCCH in an eNB subframe, in which the OFDM symbol number is reported by the RN, and the offset is smaller than the sum of the length of the PDCCH of the MBSFN subframe where the relay link of the RN is located and a first idle time. As compared with the prior art, in the embodiments of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

BRIEF DESCRIPTION OF THE DRAWINGS

To illustrate the technical solutions in the embodiments of the present invention clearly, the accompanying drawings for describing the embodiments or the prior art are given briefly below. Apparently, the accompanying drawings in the following description are only some embodiments of the present invention, and persons of ordinary skill in the art can derive other drawings of embodiments from the accompanying drawings without creative efforts.

DETAILED DESCRIPTION OF THE EMBODIMENTS

Embodiments of the present invention provide a method, a base station, and a system of configuring relay link resources.

To make the solutions of the present invention more comprehensible to persons skilled in the art, the technical solutions in the embodiments of the present invention will be clearly and comprehensively described below with reference to the accompanying drawings in the embodiments of the present invention. It is obvious that the embodiments to be described are only a part rather than all of the embodiments of the present invention. All other embodiments derived by persons of ordinary skill in the art based on the embodiments of the present invention without creative efforts should fall into the protection scope of the present invention.

Figure 1:
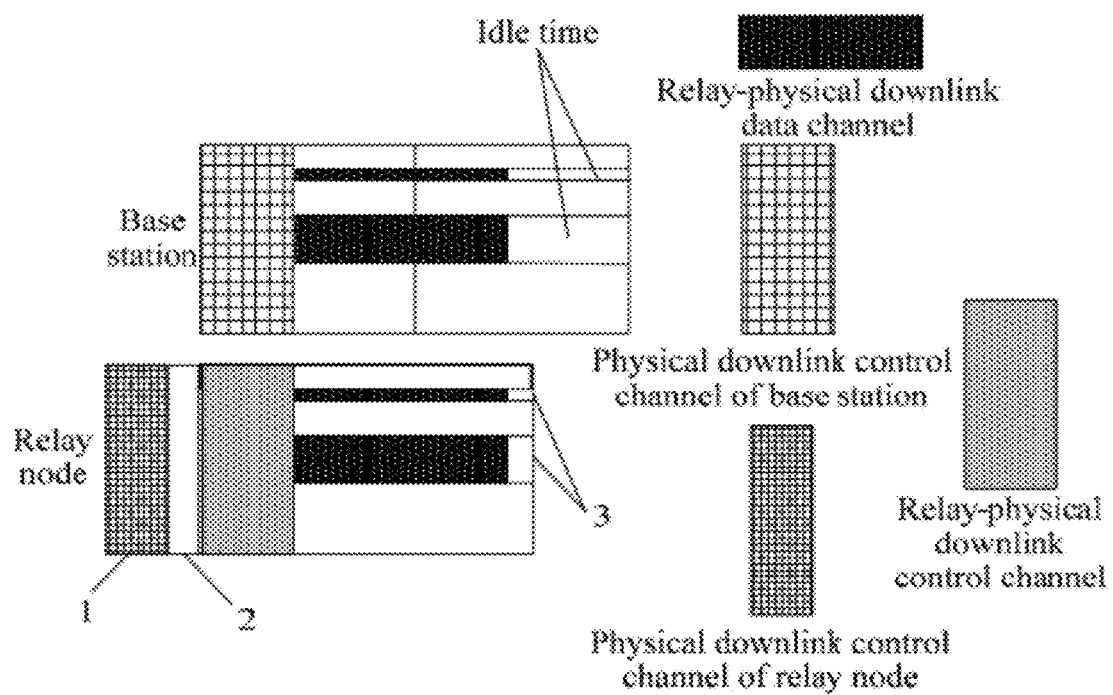
FIG. 1 is a schematic diagram of a forward offset of an RN frame relative to an eNB frame provided in the prior art.
Figure 2:
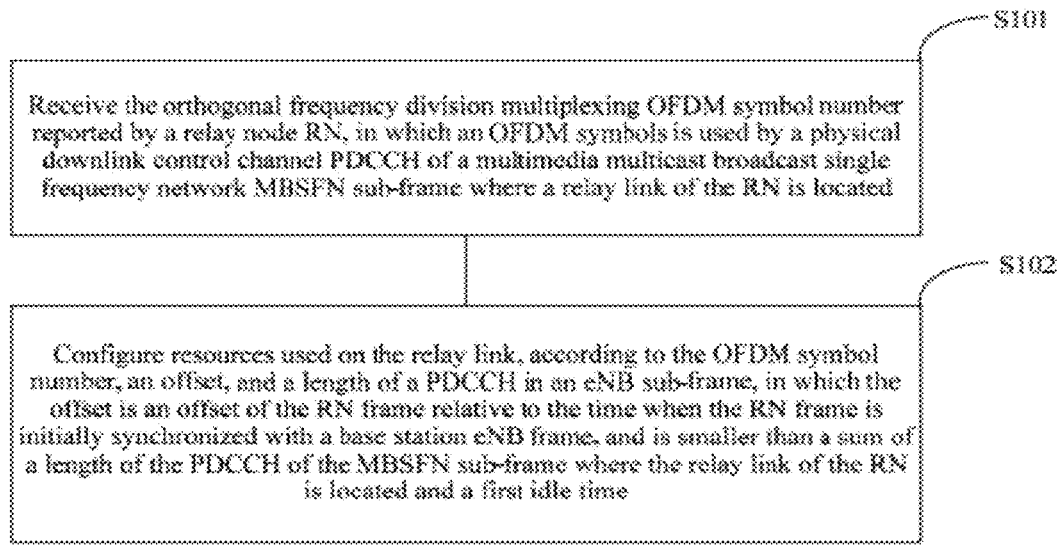
FIG. 2 is a flow chart of a method of configuring relay link resources provided in an embodiment of the present invention.

Referring to FIG. 2, it is a flow chart of a method of configuring relay link resources provided in an embodiment of the present invention. The process of the method of configuring relay link resources includes the following steps.

S101: Receive an OFDM symbol number reported by an RN, in which an OFDM symbol is used by a PDCCH of an MBSFN subframe where a relay link of the RN is located.

In an actual application, the OFDM symbol number used by the PDCCH of the MBSFN subframe where the relay link of the RN is located may be 1 or 2, and before reporting, to an eNB, the OFDM symbol number used by the PDCCH of the MBSFN subframe where the relay link of the RN is located, the RN sets the length of PDCCH of the RN as 2 OFDM symbols, and reports, upon initial access of the RN, the set number (2) of the OFDM symbol used by the PDCCH.

Or, the manner in which the RN reports, to the eNB, the OFDM symbol number actually used by the PDCCH of the RN may be reporting upon initial access of the RN, periodic/semi-static reporting, or reporting upon event triggering.

S102: Configure relay link resources according to the OFDM symbol number, an offset, and a length of a PDCCH in an eNB subframe, in which the offset is an offset of the RN frame relative to the time when the RN frame is initially synchronized with a base station eNB frame, and the offset is smaller than a sum of a length of the PDCCH of the MBSFN subframe where the relay link of the RN is located and a first idle time.

The offset is an offset of the RN frame relative to the time when the RN frame is initially synchronized with a base station eNB frame, or the offset in the embodiment of the present invention may also be equivalently described as an offset of an access link of the RN frame relative to the time of initial synchronization of the RN frame, or a time offset of the access link of the RN frame relative to a relay link of the RN frame, or a time offset of timing of the access link of the RN frame relative to timing of the relay link of the RN frame.

In the embodiment of the present invention, the offset may be pre-appointed by the RN and the eNB; or, the eNB may also configure the offset and then send notification signaling to the RN, in which the notification signaling includes the offset that is configured by the eNB and is of the RN frame relative to the time when the RN frame is initially synchronized with the eNB frame, and the time when the RN frame is initially synchronized with the eNB frame is corresponding local time when the RN frame is initially synchronized with the eNB frame, that is, the timing time of the RN receiving the eNB frame and the OFDM symbol of the eNB frame.

There are two idle time in the MBSFN subframe where the relay link of the RN is located, and are respectively referred to as a first idle time and a second idle time in order of precedence. The idle time includes a state conversion time of the RN, and in an actual system, an order of magnitude of the state conversion time is µs, for example, more than ten µs, tens of µs, 0.5 OFDM symbol, or 1 OFDM symbol.

The offset is an integral multiple of a sampling time Ts in an LTE system, a lower limit of the integral multiple of Ts is 0, an upper limit is 1 OFDM symbol, the integral multiple of Ts may adopt the upper or lower limit, and 30720×(LTE sampling time=1 ms. In a normal cyclic prefix (CP, Cyclic Prefix), 1 OFDM symbol is 2192Ts; and in an extended CP, 1 OFDM symbol is 2560Ts. The offset is greater than or equal to the state conversion time of the RN; a sum of the offset and the state conversion time of the RN is 1 OFDM symbol; or, a sum of the offset and the first idle time that includes the state conversion time of the RN is an integral multiple of the length of an OFDM symbol.

The offset may be a positive value or a negative value. When the offset is a positive value, it indicates that the RN frame is offset forward relative to the time when the RN frame is initially synchronized with the eNB frame; when the offset is a negative value, it indicates that the RN frame is offset backward relative to the time when the RN frame is initially synchronized with the eNB frame; and when the offset is 0, it indicates that the RN frame is not offset relative to the time when the RN frame is initially synchronized with the eNB frame.

The configuring the resources used on the relay link according to the OFDM symbol number and the offset includes the following.

A: Obtain start time of the eNB actually sending relay link information, according to the OFDM symbol number, the offset, and the length of the PDCCH in the eNB subframe, in which the start time of the eNB actually sending the relay link information is the same as start time of the RN actually receiving the relay link information.

In the embodiment of the present invention, first, start time of the RN pre-receiving the relay link information is obtained according to the OFDM symbol number and the offset, and start time of the eNB pre-sending the relay link information is obtained according to the length of the PDCCH in the eNB subframe; then, a maximum of the time when the RN pre-receives the relay link information and the start time of the eNB pre-sending the relay link information is taken to serve as the start time of the eNB actually sending the relay link information, that is, the start time of the RN actually receiving the relay link information.

B: Obtain the relay link resources according to the start time of the eNB actually sending the relay link information.

The relay link resources are time domain resources on the relay link for communication between the RN and the eNB, and the relay link resources are used for transmitting the relay link information.

The relay link information includes: a relay_physical downlink control channel (R_PDCCH, Relay_PDCCH), a relay_physical downlink data channel (R_PDSCH, Relay_Physical Downlink Shared Channel), a relay_physical control format indicator channel (R_PCFICH, Relay_Physical Control Format Indicator Channel), or a relay_physical hybrid automatic retransmission indicator channel (R_PHICH, Relay_Physical Hybrid Indicator Channel). The R_PDCCH is a PDCCH sent by the eNB to the RN, and the R_PDSCH, the R_PCFICH, and the R_PHICH are also downlink channels sent by the eNB to the RN.

In the embodiment of the present invention, before receiving the OFDM symbol, the eNB may pre-appoint or configure the first idle time of the RN to ensure that the OFDM symbol following the first idle time is in time synchronization with the OFDM symbol of the eNB frame or the time when the relay link of the RN frame is initially synchronized with the eNB frame remains unchanged.

The first idle time is as follows.

When the value of the offset is between 0 and 1 OFDM symbol (not including 0 OFDM symbol and 1 OFDM symbol), and when the offset is a positive value, the length of the first idle time is the offset; when the offset is a negative value, the length of the first idle time is (1 OFDM symbol−offset).

When the value of the offset is 0 or 1 OFDM symbol, the length of the first idle time is 1 OFDM symbol.

The eNB obtains, according to the OFDM symbol and the first idle time, the start time of the RN pre-receiving the relay link information; and the eNB obtains, according to the length of the PDCCH of the eNB subframe, the start time of the eNB pre-sending the relay link information.

After obtaining the start time of the RN pre-receiving the relay link information, the eNB may reconfigure the first idle time according to the OFDM symbol, the offset, and the length of the PDCCH of the eNB subframe, so that the time of the RN actually receiving the relay link information is the same as the time of the eNB actually sending the relay link information. The first idle time may vary dynamically or semi-statically.

In the embodiment of the present invention, the action of resetting the first idle time and the action of obtaining the start time of the eNB pre-sending the relay link information are performed without precedence, and the two actions are interchangeable with each other when being performed.

The reconfiguring the first idle time is as follows.

When the value of the offset is between 0 and 1 OFDM symbol (not including 0 OFDM symbol and 1 OFDM symbol), and when the offset is a positive value, and the length of the PDCCH of the RN subframe>=the length of the PDCCH of the eNB subframe, the first idle time having a length of the offset is set following the PDCCH of the MBSFN subframe that is for the relay link of the RN.

When the value of the offset is between 0 and 1 OFDM symbol (not including 0 OFDM symbol and 1 OFDM symbol), and when the offset is a positive value, and the length of the PDCCH of the RN subframe<the length of the PDCCH of the eNB subframe, the first idle time having a length of [the value of the offset+(the length of the PDCCH of the eNB subframe−the length of the PDCCH of the RN subframe)] is set following the PDCCH of the MBSFN subframe that is for the relay link of the RN.

When the value of the offset is between 0 and 1 OFDM symbol (not including 0 OFDM symbol and 1 OFDM symbol), and when the offset is a negative value, and the length of the PDCCH of the RN subframe>=the length of the PDCCH of the eNB subframe, the first idle time having a length of (1 OFDM symbol−the value of the offset) is set following the PDCCH of the MBSFN subframe that is for the relay link of the RN.

When the value of the offset is between 0 and 1 OFDM symbol (not including 0 OFDM symbol and 1 OFDM symbol), and when the offset is a negative value, and the length of the PDCCH of the RN subframe<the length of the PDCCH of the eNB subframe, the first idle time having a length of [(1 OFDM symbol−the value of the offset)+(the length of the PDCCH of the eNB subframe−the length of the PDCCH of the RN subframe)−1 OFDM symbol] is set following the PDCCH of the MBSFN subframe that is for the relay link of the RN.

Figure 3:
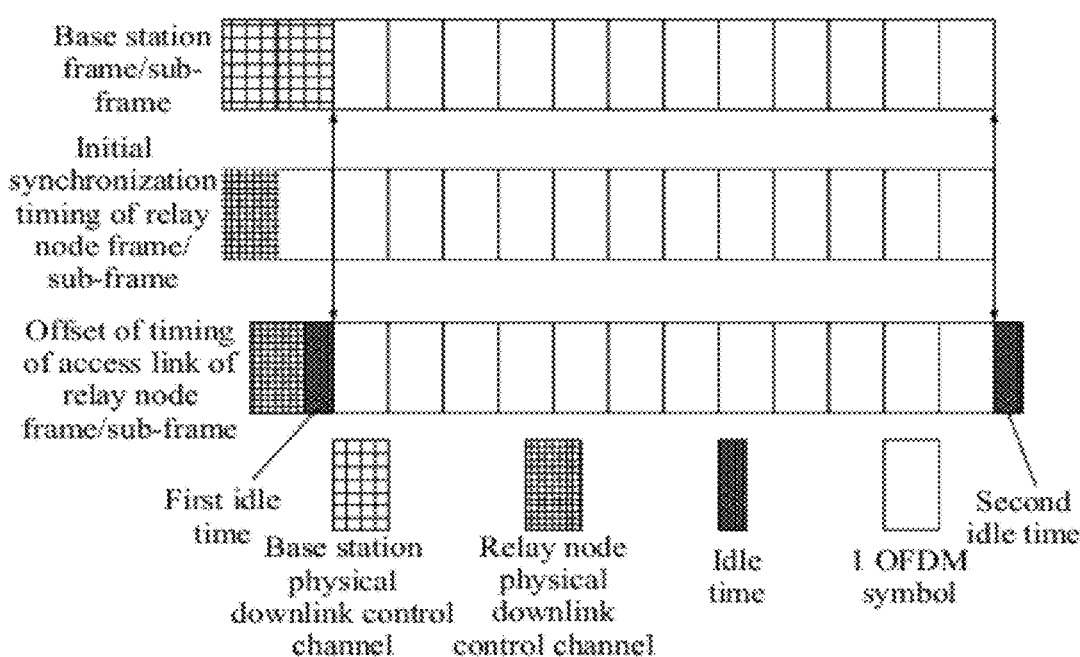
FIG. 3 is a schematic diagram of an offset of an RN frame relative to the time when the RN frame is initially synchronized with an eNB frame provided in an embodiment of the present invention.

When the value of the offset is between 0 and 1 OFDM symbol, after the first idle time is reconfigured according to the above method, the RN can effectively receive the relay link information sent by the eNB, and OFDM symbol following the first idle time keeps timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN, in which when the offset is a negative value, the length of the second idle time is the value of the offset; when the offset is a positive value, the length of the second idle time is (1 OFDM symbol−the value of the offset), as shown in FIG. 3. FIG. 3 is a schematic diagram of an offset of an RN frame relative to the time when the RN frame is initially synchronized with an eNB frame provided in an embodiment of the present invention. In FIG. 3, the RN frame is offset backward by 0.5 OFDM symbol relative to the time when the RN frame is initially synchronized with the eNB frame.

When the offset is 0 OFDM symbol, the first idle time of 1 OFDM symbol is set following the PDCCH of the MBSFN subframe that is for the relay link of the RN, and the OFDM symbol following the first idle time keeps timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN, in which the length of the second idle time is 1 OFDM symbol.

When the value of the offset is 1 OFDM symbol, and when the offset is a positive value, and the length of the PDCCH of the RN subframe>=the length of the PDCCH of the eNB subframe, the first idle time having a length of the offset is set following the PDCCH of the MBSFN subframe that is for the relay link of the RN.

When the value of the offset is 1 OFDM symbol, and when the offset is a positive value, and the length of the PDCCH of the RN subframe<the length of the PDCCH of the eNB subframe, the first idle time having a length of [the value of the offset+(the length of the PDCCH of the eNB subframe−the length of the PDCCH of the RN subframe)] is set following the PDCCH of the MBSFN subframe that is for the relay link of the RN.

When the value of the offset is 1 OFDM symbol, and when the offset is a negative value, and the length of the PDCCH of the RN subframe>=the length of the PDCCH of the eNB subframe, the first idle time having a length of the offset is set following the PDCCH of the MBSFN subframe that is for the relay link of the RN.

When the value of the offset is 1 OFDM symbol, and when the offset is a negative value, and the length of the PDCCH of the RN subframe<the length of the PDCCH of the eNB subframe, if the PDCCH of the MBSFN subframe for the relay link of the RN is 1 OFDM symbol, and the PDCCH of the eNB is 4 OFDM symbols, the first idle time having a length of 2 OFDM symbols is set following the PDCCH of the MBSFN subframe that is for the relay link of the RN; in other situations, the first idle time having a length of 1 OFDM symbol is set following the PDCCH of the MBSFN subframe that is for the relay link of the RN.

When the value of the offset is 1 OFDM symbol, after the first idle time is reconfigured according to the above method, OFDM symbol following the first idle time keeps timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN, in which the length of the second idle time is 1 OFDM symbol.

If a device deployer performs corresponding processing on the deployment of RNs while preconsidering potential interference that may exist between adjacent RNs in network device deployment, the eNB, without the need of considering the interference between the adjacent RNs, directly obtains, according to the offset and the number that is reported by the RN and is of the OFDM symbol used by the PDCCH of the MBSFN subframe where the relay link of the RN is located, the start time of the eNB pre-sending the relay link information and the start time of the RN pre-receiving the relay link information. If the device deployer does not preconsider the potential interference that may exist between adjacent RNs in network device deployment, before the start time of the eNB pre-sending the relay link information and the start time of the RN pre-receiving the relay link information are obtained, the method may further include:

configuring, according to the interference between the adjacent RNs, the OFDM symbol number used by the PDCCH of the MBSFN subframe where the relay link of the RN is located.

In the embodiment of the present invention, if the interference between the adjacent RNs is greater than a predetermined interference value and the OFDM symbol number used by the PDCCH of the MBSFN subframe where the relay link of the RN is located is 1, the OFDM symbol number used by the PDCCH of the MBSFN subframe where the relay link of the RN is located is configured as 2; if the interference between the adjacent RNs is smaller than the predetermined interference value, or the interference between the adjacent RNs is greater than the predetermined interference value and the OFDM symbol number used by the PDCCH of the MBSFN subframe where the relay link of the RN is located is 2, the OFDM symbol number used by the PDCCH of the MBSFN subframe where the relay link of the RN is located is kept unchanged. The predetermined interference value is set by the eNB, and may be determined by the eNB according to the deployment of RNs in the network. The setting of the predetermined interference value is not limited to being determined by the eNB according to the deployment of the RNs in the network.

In the embodiment of the present invention, the eNB may generate indication information according to the configured OFDM symbol number used by the PDCCH of the MBSFN subframe where the relay link of the RN is located, and send the indication information to the RN. The indication information includes modification information or confirmation information, the modification information represents that the OFDM symbol number used by the PDCCH of the MBSFN subframe where the relay link of the RN is located is configured as 2, and the confirmation information represents that the OFDM symbol number used by the PDCCH of the MBSFN subframe where the relay link of the RN is located is kept unchanged.

Accordingly, the RN may confirm or modify, according to the indication information sent by the eNB, the OFDM symbol number used by the PDCCH of the MBSFN subframe where the relay link of the RN is located.

The network may also classify RNs with potential interference between adjacent RNs being greater than the predetermined interference value as one group in advance, and the eNB configures the OFDM symbol number, where an OFDM symbol is used by a PDCCH of an MBSFN subframe where a relay link of an RN belonging to this group is located as 2.

Before obtaining the start time of the eNB pre-sending the relay link information and the start time of the RN pre-receiving the relay link information, the eNB may also perform priority configuration on the number of PDCCH of the eNB subframe according to the OFDM symbol number used by the PDCCH of the MBSFN subframe where the relay link of the RN is located; and the eNB uses the priority configuration information as a reference factor when determining the number of the PDCCH of the eNB subframe. The OFDM symbol number used by the PDCCH of the MBSFN subframe where the relay link of the RN is located may be the number that is reported by the RN and is of the OFDM symbol used by the PDCCH of the MBSFN subframe where the relay link of the RN is located or may be the configured OFDM symbol number used by the PDCCH of the MBSFN subframe where the relay link of the RN is located.

In this embodiment, relay link resources are configured according to an offset of an RN frame relative to the time when the RN frame is initially synchronized with an eNB frame, the number that is reported by the RN and is of the OFDM symbol used by a PDCCH of an MBSFN subframe where a relay link of the RN is located, and the length of a PDCCH of an eNB subframe, in which the offset is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

In an LTE system, 1 frame includes 10 subframes, and 1 subframe includes 14 OFDM symbols (in a normal CP) or 12 OFDM symbols (in an extended CP). The following embodiments are all illustrated by taking relay link resources in the normal CP as an example. Since the condition of relay link resources in the extended CP is similar to that in the normal CP, the condition of relay link resources in the extended CP will not be described in detail in the specification, and reference can be made to the description of the condition of relay link resources in the normal CP.

In the embodiments of the present invention, in the normal CP, 14 OFDM symbols in 1 subframe are counted from 0, in which a $1^{st}$ OFDM symbol is OFDM symbol 0, and so forth, and the $14^{th}$ OFDM symbol is OFDM symbol 13.

Figure 4:
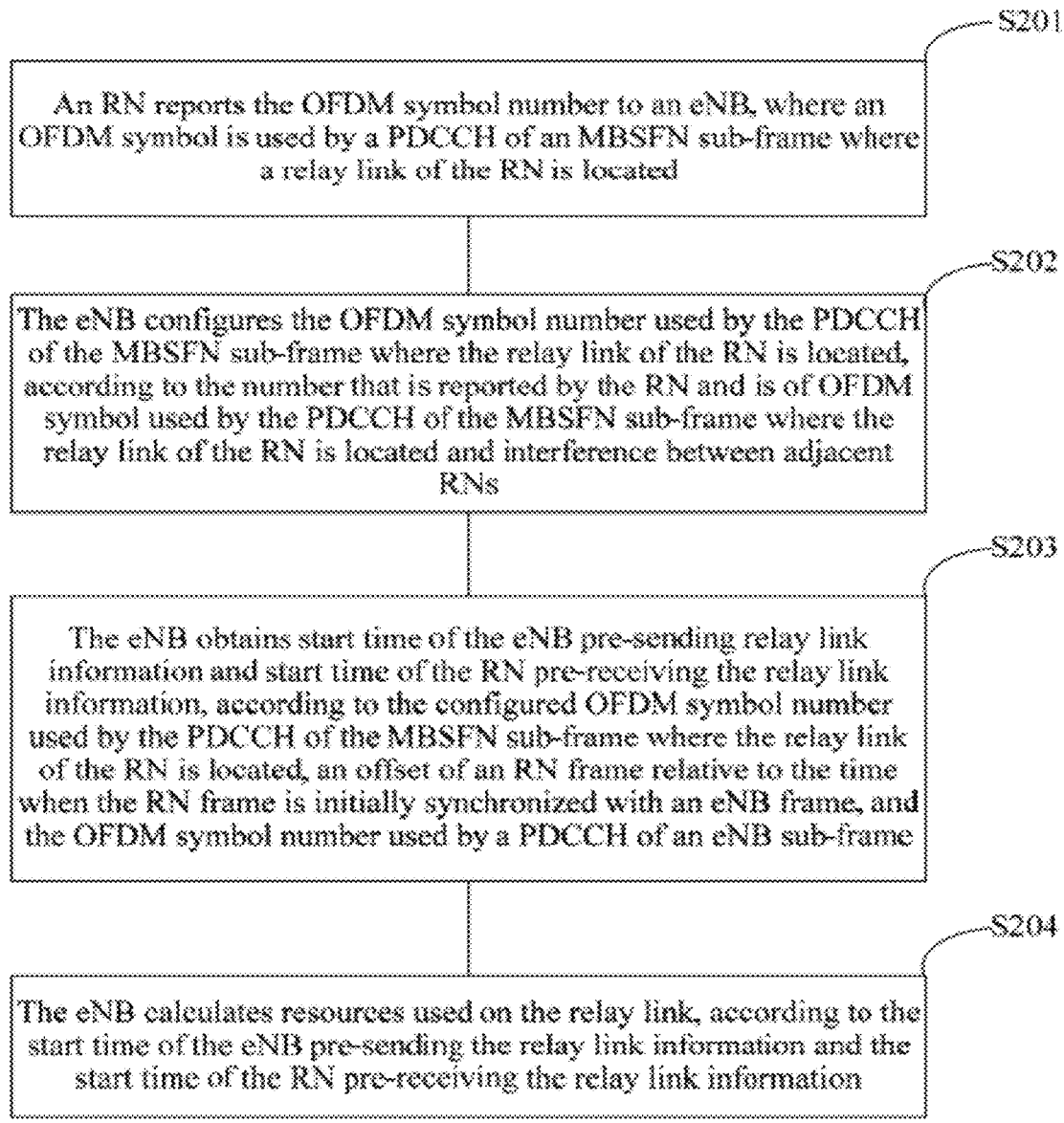
FIG. 4 is a flow chart of another method of configuring relay link resources provided in an embodiment of the present invention.

Referring to FIG. 4, it is a flow chart of another method of configuring relay link resources provided in an embodiment of the present invention. As shown in FIG. 4, the process of the method of configuring relay link resources includes the following steps.

S201: An RN reports the OFDM symbol number to an eNB, where an OFDM symbol is used by a PDCCH of an MBSFN subframe where a relay link of the RN is located.

Before the RN reports, to the eNB, the OFDM symbol number used by the PDCCH of the MBSFN subframe where the relay link of the RN is located, the RN may set the OFDM symbol number used by the PDCCH of the MBSFN subframe where the relay link of the RN is located as 2, and report, upon initial access of the RN, the set number (2) of the OFDM symbol used by the PDCCH.

Or, the RN may not set the OFDM symbol number, where an OFDM symbol is used by the PDCCH of the RN; but report the OFDM symbol number to the eNB, where an OFDM symbol is actually used by the PDCCH of the RN. The reporting manner may be reporting upon initial access of the RN, periodic/semi-static reporting, or reporting upon event triggering.

S202: The eNB configures, according to the number that is reported by the RN and is of the OFDM symbol used by the PDCCH of the MBSFN subframe where the relay link of the RN is located and interference between adjacent RNs, the OFDM symbol number used by the PDCCH of the MBSFN subframe where the relay link of the RN is located.

In this embodiment, the eNB needs to determine, according to the possible interference between adjacent RNs deployed in a network, whether each RN may have the different number of the OFDM symbol used by a PDCCH of an MBSFN subframe where a relay link of the RN is located, so as to determine whether to confirm or modify the number that is reported by the RN and is of the OFDM symbol used by the PDCCH of the MBSFN subframe where the relay link of the RN is located, thereby configuring the OFDM symbol number used by the PDCCH of the MBSFN subframe where the relay link of the RN is located. The interference between the adjacent RNs depends on the number of adjacent RNs deployed in the network, the distance between RNs, antenna configuration of an RN: omnidirectional/directional, downtilted or not, and 1 set or 2 sets of antennas, and the condition of a channel between RNs (for example, whether there is shadow fading caused by shading, penetration loss, or the like).

In an actual application, the eNB sets a predetermined interference value, configures, through the predetermined interference value and the number that is reported by the RN and is of the OFDM symbol used by the PDCCH of the MBSFN subframe where the relay link of the RN is located, the OFDM symbol number used by the PDCCH of the MBSFN subframe where the relay link of the RN is located, and further generates indication information to determine whether to confirm or modify the number that is reported by the RN and is of the OFDM symbol used by the PDCCH of the MBSFN subframe where the relay link of the RN is located. The indication information may be confirmation information or modification information. The predetermined interference value may be determined by the eNB according to the deployment of RNs in the network, but the setting of the predetermined interference value is not limited to being determined by the eNB according to the deployment of RNs in the network.

If the interference between the adjacent RNs is greater than the predetermined interference value and the OFDM symbol number used by the PDCCH of the MBSFN subframe where the relay link of the RN is located is 1, the OFDM symbol number used by the PDCCH of the MBSFN subframe where the relay link of the RN is located is configured as 2. The indication information generated at this time is modification information, and the modification information represents that the OFDM symbol number used by the PDCCH of the MBSFN subframe where the relay link of the RN is located is configured as 2. If the interference between the adjacent RNs is smaller than the predetermined interference value, or the interference between the adjacent RNs is greater than the predetermined interference value and the OFDM symbol number used by the PDCCH of the MBSFN subframe where the relay link of the RN is located is 2, the OFDM symbol number used by the PDCCH of the MBSFN subframe where the relay link of the RN is located is kept unchanged. The indication information generated at this time is confirmation information, and the confirmation information represents that the OFDM symbol number used by the PDCCH of the MBSFN subframe where the relay link of the RN is located is kept unchanged.

For example, when multiple RNs exist in the network, if in two RNs close to each other, an MBSFN subframe for relay link/backhaul (backhaul) transmission of RN1 has a PDCCH with a length of 1 OFDM symbol, while an MBSFN subframe for relay link/backhaul (backhaul) transmission of RN2 has a PDCCH with a length of 2 OFDM symbols, when the RN2 sends the PDCCH to a UE of RN2 on a $2^{nd}$ OFDM symbol of RN2, interference may be caused to the OFDM symbol received by a $1^{st}$ relay link of RN1, and receiving a $1^{st}$ OFDM symbol on the relay link of RN1 may seriously affected when the condition of a channel between two RNs is good, for example, in line of sight. To avoid such interference, in this situation, the eNB needs to configure the two PDCCHs of the RNs to which potential interference is caused both as 2 OFDM symbols, and at this time, the eNB needs to send modification information to inform the corresponding RN that the PDCCH of the MBSFN subframe for relay link transmission uses 2 OFDM symbols.

Accordingly, the RN receives the indication information, and confirms or modifies, according to the indication information, the OFDM symbol number used by the PDCCH of the MBSFN subframe where the relay link of the RN is located.

The indication information may explicitly use 1 bit to indicate whether the indication information is confirmation information or modification information, in which the confirmation information represents that the OFDM symbol number used by the PDCCH of the MBSFN subframe where the relay link of the RN is located is kept unchanged, and the modification information represents that the OFDM symbol number used by the PDCCH of the MBSFN subframe where the relay link of the RN is located is modified from 1 to 2. The confirmation information is represented by 1, and the modification information is represented by 0; or the confirmation information is represented by 0, and the modification information is represented by 1.

Or, the indication information may also be implicitly included in another message/signaling sent by the eNB to the RN, for example, included in an initial access response message, downlink pilot, a downlink control channel, or downlink data.

S203: The eNB obtains start time of the eNB pre-sending relay link information and start time of the RN pre-receiving the relay link information, according to the configured OFDM symbol number used by the PDCCH of the MBSFN subframe where the relay link of the RN is located, an offset of an RN frame relative to the time when the RN frame is initially synchronized with an eNB frame, and the OFDM symbol number used by a PDCCH of an eNB subframe.

The offset may be pre-appointed by the RN and the eNB; or, the eNB may also configure the offset and then send notification signaling to the RN, in which the notification signaling includes the offset that is configured by the eNB and is of the RN frame relative to the time when the RN frame is initially synchronized with the eNB frame.

In the embodiment of the present invention, the eNB may pre-appoint or configure the first idle time of the RN to ensure that the OFDM symbol following the first idle time is in time synchronization with the OFDM symbol of the eNB frame or the time when the relay link part of the RN frame is initially synchronized with the eNB frame is kept unchanged.

The first idle time is as follows.

When the value of the offset is between 0 and 1 OFDM symbol (not including 0 OFDM symbol and 1 OFDM symbol), and when the offset is a negative value, the length of the first idle time is (1 OFDM symbol–the value of the offset).

The eNB obtains the start time of the RN pre-receiving the relay link information, according to the configured OFDM symbol number used by the PDCCH of the MBSFN subframe where the relay link of the RN is located and the first idle time; and the eNB obtains the start time of the eNB pre-sending the relay link information, according to the length of the PDCCH of the eNB subframe. A maximum of the start time of the eNB pre-sending the relay link information and the start time of the RN pre-receiving the relay link information is taken to serve as start time of the eNB actually sending the relay link information, that is, start time of the RN actually receiving the relay link information. The time reference of the start time of the RN pre-receiving the relay link information is the time of initial synchronization timing between the RN frame and the eNB frame.

In this embodiment, the offset is that the RN frame is offset by negative 0.5 OFDM symbol relative to the initial synchronization timing between the RN frame and the eNB frame, that is, the RN frame is offset backward by 0.5 OFDM symbol relative to the initial synchronization timing between the RN frame and the eNB frame, or an access link of the RN frame is offset backward by 0.5 OFDM symbol relative to the time of initial synchronization of the RN frame, or the access link of the RN frame is offset backward by 0.5 OFDM symbol relative to a relay link of the RN frame.

Accordingly, after the RN performs initial synchronization timing with the eNB, the RN offsets the RN frame backward by 0.5 OFDM symbol relative to the initial synchronization timing between the RN frame and the eNB frame, or offsets the access link of the RN frame backward by 0.5 OFDM symbol relative to the time of initial synchronization of the RN frame, or offsets the access link of the RN frame backward by 0.5 OFDM symbol relative to the relay link of the RN frame.

The RN performs the initial synchronization timing (including time domain and frequency domain synchronization) with the eNB, that is, initial synchronization timing is performed on an RN frame and an eNB frame, or initial synchronization timing is performed on an RN subframe and an eNB subframe, or initial synchronization timing is performed on the OFDM symbol of the RN and the OFDM symbol of the eNB.

In an LTE system, the length of a PDCCH of an eNB subframe may be 1, 2, 3, or 4 OFDM symbols, and the length of a PDCCH of an MBSFN subframe where a relay link of an RN is located may be 1 or 2 OFDM symbols, so 0.5 OFDM symbol is definitely smaller than the sum of the length of the PDCCH of the MBSFN subframe where the relay link of the RN is located and the first idle time.

The eNB reconfigures the first idle time according to the configured OFDM symbol number used by the PDCCH of the MBSFN subframe where the relay link of the RN is located, the offset, and the length of the PDCCH of the eNB subframe, so that the time when the RN actually receives the relay link information is the same as the time when the eNB actually sends the relay link information. The time when the eNB actually sends the relay link information is a maximum of the time when the RN pre-receives the relay link information and the start time of the eNB pre-sending the relay link information.

When the RN frame is offset backward by 0.5 OFDM symbol relative to the time when the RN frame is initially synchronized with the eNB frame, the reconfiguration of the first idle time following the PDCCH in the RN frame includes:

when the length of the PDCCH of the RN subframe>=the length of the PDCCH of the eNB subframe, setting the first idle time having a length of (1 OFDM symbol–the value of the offset) following the PDCCH of the MBSFN subframe that is for the relay link of the RN; and when the length of the PDCCH of the RN subframe<the length of the PDCCH of the eNB subframe, setting the first idle time having a length of [(1 OFDM symbol–the value of the offset)+(the length of the PDCCH of the eNB subframe–the length of the PDCCH of the RN subframe)–1 OFDM symbol] following the PDCCH of the MBSFN subframe that is for the relay link of the RN.

After the first idle time is reconfigured, the OFDM symbol following the first idle time keeps timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN, in which the length of the second idle time is the value of the offset, as shown in FIG. 3.

S204: The eNB obtains relay link resources according to the start time of the eNB pre-sending the relay link information and the start time of the RN pre-receiving the relay link information.

It is assumed that the start time of the eNB pre-sending the relay link information starts from an OFDM symbol with a serial number of a, the start time of the RN pre-receiving the relay link information starts from an OFDM symbol with a serial number of b, the relay link resources include f OFDM symbols, f=14–max(a,b), where the value of max(a,b) is a serial number of an OFDM symbol corresponding to the start time of the eNB actually sending the relay link information, and the start time of the eNB actually sending the relay link information is the same as the start time of the RN actually receiving the relay link information.

The start time of the eNB pre-sending the relay link information is counted from 0, 0 represents that the relay link information can be sent from OFDM symbol 0, and so forth; the start time of the RN pre-receiving the relay link information is relative to the eNB subframe, and the time reference of the start time is OFDM symbol 0, 1, 2, . . . , 13 of the eNB subframe.

When the OFDM symbol number reported by the RN is 2, the condition of the relay link resources is shown in Table 1.

TABLE 1

| b | a |||||
|---|---|---|---|---|
|   | 1 | 2 | 3 | 4 |
|   |   | f = 14 − max(a, b) |||
| 3 | 11 | 11 | 11 | 10 |

As can be known from Table 1, the start time of the RN pre-receiving the relay link information starts from the OFDM symbol with the serial number of 3 (using the time of initial synchronization of the eNB subframe as the time reference).

When the OFDM symbol number reported by the RN is 2, as compared with the prior art in which the eNB sets the OFDM symbol number used by the PDCCH of the eNB as a maximum of 4, the relay link resources are increased, and the resource waste of the system is reduced, thereby improving the resource utilization efficiency of the system.

When the PDCCH of the MBSFN subframe where the relay link of the RN is located includes the variable number of OFDM symbol, the condition of the relay link resources is shown in Table 2.

TABLE 2

| b | a ||||
|---|---|---|---|---|
|   | 1 | 2 | 3 | 4 |
|   |   | f = 14 − max(a, b) |||
| 2 | 12 | 12 | 11 | 10 |
| 3 | 11 | 11 | 11 | 10 |

Before obtaining the start time of the eNB pre-sending the relay link information and the start time of the RN pre-receiving the relay link information, the eNB may perform priority configuration on the number of PDCCH of the eNB subframe according to the configured OFDM symbol number used by the PDCCH of the MBSFN subframe where the relay link of the RN is located, and generate priority configuration information.

When relay link resources need to be increased or the eNB does not need to send many PDCCHs in the subframe, the eNB uses the priority configuration information as a reference factor when determining the number of the PDCCH of the eNB subframe. For example, as can be seen from Table 2, when the OFDM symbol number used by the PDCCH of the MBSFN subframe where the relay link of the RN is located is 1, the priority of the OFDM symbol number used by the PDCCH of the eNB is 1=2>3>4; when the OFDM symbol number used by the PDCCH of the MBSFN subframe where the relay link of the RN is located is 2, the priority of the OFDM symbol number used by the PDCCH of the eNB is 1=2=3>4.

As can be seen from Table 2, when the RN reports, to the eNB, the OFDM symbol number actually used by the PDCCH of the MBSFN subframe where the relay link of the RN is located, the OFDM symbol number used by the PDCCH of the MBSFN subframe where the relay link of the RN is located is 1, and when the OFDM symbol number used by the PDCCH of the subframe of the eNB where the relay link is located is 1 or 2, the relay link resources are 12 OFDM symbols, greater than the relay link resources in a situation that the RN sets the OFDM symbol number used by the PDCCH of the MBSFN subframe where the relay link of the RN is located as 2, thereby further increasing the relay link resources.

If the device deployer performs corresponding processing on the deployment of RNs while preconsidering potential interference that may exist between adjacent RNs in network deployment, the eNB, without the need of considering the interference between the adjacent RNs, directly obtains, according to the number that is reported by the RN and is of the OFDM symbol used by the PDCCH of the MBSFN subframe where the relay link of the RN is located, the start time of the eNB pre-sending the relay link information and the start time of the RN pre-receiving the relay link information, and performs the subsequent process. In a corresponding subsequent process, the configured OFDM symbol number used by the PDCCH of the MBSFN subframe where the relay link of the RN is located is the number that is reported by the RN and is of the OFDM symbol used by the PDCCH of the MBSFN subframe where the relay link of the RN is located.

In this embodiment, relay link resources are configured according to an offset of an RN frame relative to initial synchronization timing between the RN frame and an eNB frame, the number that is reported by the RN and is of OFDM symbol used by a PDCCH of an MBSFN subframe where a relay link of the RN is located, and the length of a PDCCH in an eNB subframe, in which the value of the offset is 0.5 OFDM symbol and is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum, but configures relay link resources according to the actual length of the PDCCH reported by the RN, so as to further increase the relay link resources and reduce resource waste.

Figure 5:
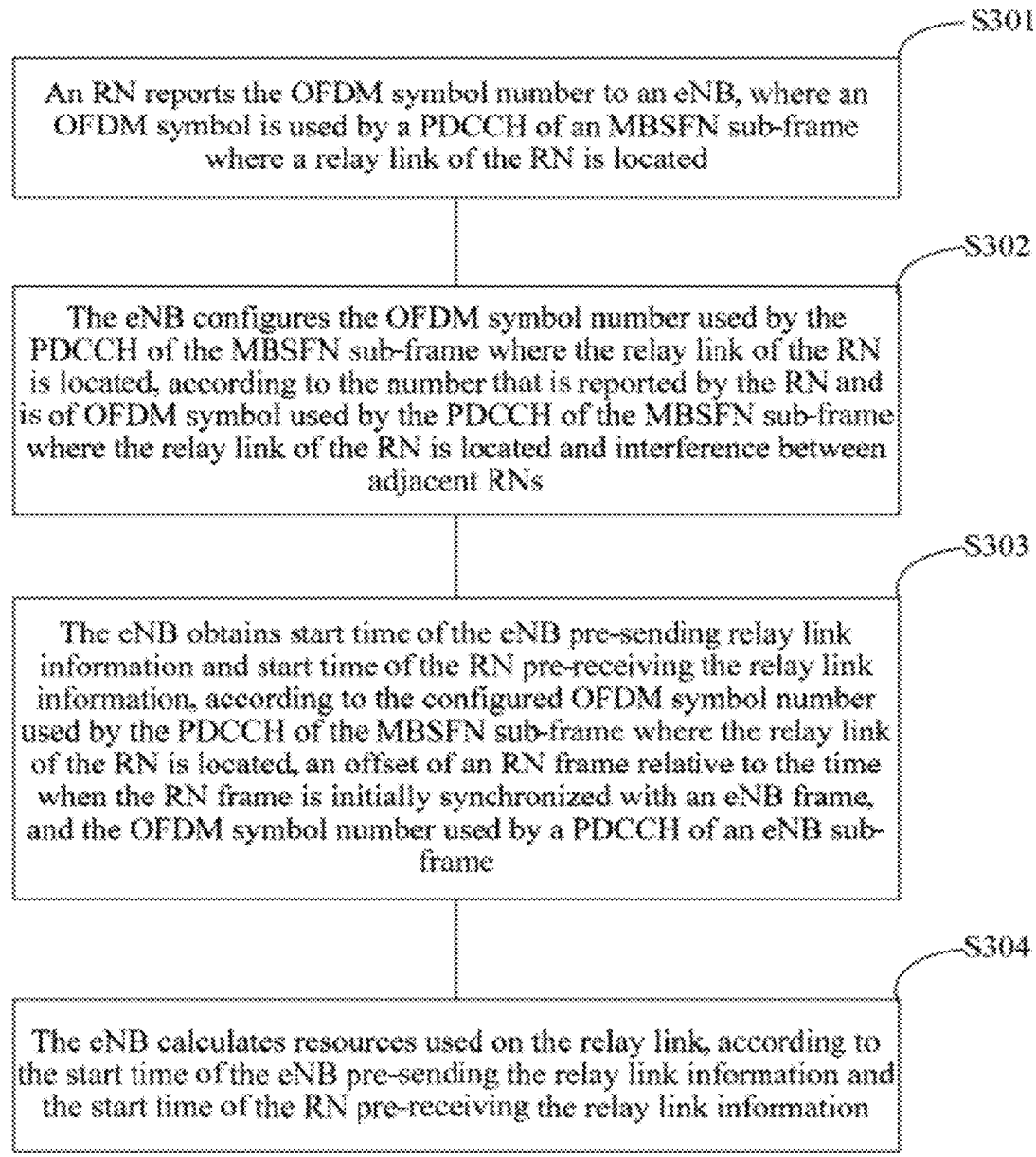
FIG. 5 is a flow chart of another method of configuring relay link resources provided in an embodiment of the present invention.

Referring to FIG. 5, it is a flow chart of another method of configuring relay link resources provided in an embodiment of the present invention. As shown in FIG. 5, the process of the method of configuring relay link resources includes the following steps.

S301: An RN reports the OFDM symbol number to an eNB, where an OFDM symbol is used by a PDCCH of an MBSFN subframe where a relay link of the RN is located.

S301 is similar to S201 and will not be described herein, and reference can be made to S201.

S302: The eNB configures the OFDM symbol number used by the PDCCH of the MBSFN subframe where the relay link of the RN is located, according to the number that is reported by the RN and is of the OFDM symbol used by the PDCCH of the MBSFN subframe where the relay link of the RN is located and interference between adjacent RNs.

S302 is similar to S202 and will not be described herein, and reference can be made to S202.

S303: The eNB obtains start time of the eNB pre-sending relay link information and start time of the RN pre-receiving the relay link information, according to the configured OFDM symbol number used by the PDCCH of the MBSFN subframe where the relay link of the RN is located, an offset of an RN frame relative to the time when the RN frame is initially synchronized with an eNB frame, and the OFDM symbol number used by a PDCCH of an eNB subframe.

In the embodiment of the present invention, the eNB may pre-appoint or configure a first idle time of the RN according to the offset. The first idle time is as follows.

When the offset is 0 OFDM symbol, the length of the first idle time is 1 OFDM symbol.

The eNB obtains the start time of the RN pre-receiving the relay link information, according to the OFDM symbol and the first idle time; and the eNB obtains the start time of the eNB pre-sending the relay link information, according to the length of the PDCCH of the eNB subframe.

In this embodiment, the offset is that the RN frame is offset by 0 OFDM symbol relative to the initial synchronization timing between the RN frame and the eNB frame, that is, the RN frame is not offset relative to the time when the RN frame is initially synchronized with the eNB frame, or an access link of the RN frame is not offset relative to the time of initial synchronization of the RN frame, or the access link of the RN frame is not offset relative to a relay link of the RN frame.

Accordingly, after the RN is initially synchronized with the eNB, the RN frame is offset by 0 OFDM symbol relative to the time when the RN frame is initially synchronized with the eNB frame.

The eNB reconfigures the first idle time according to the OFDM symbol, the offset, and the length of the PDCCH of the eNB subframe, so that the time when the RN actually receives the relay link information is the same as the time when the eNB actually sends the relay link information.

The reconfiguration of the first idle time includes:

setting the first idle time of 1 OFDM symbol following the PDCCH of the MBSFN subframe that is for the relay link of the RN, then OFDM symbol following the first idle time keeps timing synchronization with the OFDM symbol of the eNB, or timing of the OFDM symbol following the first idle time is aligned with timing of OFDM symbol used when the RN is initially synchronized with the eNB; and second idle time is located at the end of the MBSFN subframe of the relay link of the RN.

In this embodiment, in a normal CP, if the time of performing state conversion once is 0.5 OFDM symbol, the state conversion of the RN in aligned frames occupies 0.5 OFDM symbol, so that the RN cannot receive additional 0.5 OFDM symbol sent by the eNB. As a result, the time incapable of sending or receiving in state conversion of the RN can be set as 1 OFDM, and for ease of description, the idle time of the RN is equivalent to the state conversion time of the RN.

S304: The eNB obtains relay link resources according to the start time of the eNB pre-sending the relay link information and the start time of the RN pre-receiving the relay link information.

It is assumed that the start time of the eNB pre-sending the relay link information starts from an OFDM symbol with a serial number of a, the start time of the RN pre-receiving the relay link information starts from an OFDM symbol with a serial number of b, the relay link resources include f OFDM symbols, f=14−max(a,b)−1, where the value of max(a,b) is a serial number of an OFDM symbol corresponding to the start time of the eNB actually sending the relay link information, and the start time of the eNB actually sending the relay link information is the same as the start time of the RN actually receiving the relay link information.

The start time of the eNB pre-sending the relay link information is counted from 0, 0 represents that the relay link information can be sent from OFDM symbol 0, and so forth; the start time of the RN pre-receiving the relay link information is relative to the eNB subframe, and the time reference of the start time is OFDM symbol 0, 1, 2, . . . , or 13 of the eNB subframe; in the formula f=14−max(a,b)−1, "1" is the state conversion time of the RN with a unit of OFDM symbol.

When the OFDM symbol number reported by the RN is 2, the condition of the relay link resources is shown in Table 3.

TABLE 3

| b | a | | | |
|---|---|---|---|---|
| | 1 | 2 | 3 | 4 |
| | | f = 14 − max(a, b) − 1 | | |
| 3 | 10 | 10 | 10 | 9 |

When the OFDM symbol number reported by the RN is 2, as compared with the prior art in which the eNB sets the OFDM symbol number used by the PDCCH of the eNB as a maximum of 4, the relay link resources are increased, and the resource waste of a system is reduced, thereby improving the resource utilization efficiency of the system. Since the range of length variation of a control channel of a normal subframe of the eNB is greater than the dynamic range of length variation of a control symbol of an MBSFN subframe, the method that the eNB sets the OFDM symbol number used by the PDCCH of the eNB as a maximum of 4 in the prior art affects the resources used by the UE under the eNB and increases resource waste of the system.

When the PDCCH of the MBSFN subframe where the relay link of the RN is located includes the variable number of OFDM symbol, the condition of the relay link resources is shown in Table 4.

TABLE 4

| b | a | | | |
|---|---|---|---|---|
| | 1 | 2 | 3 | 4 |
| | | f = 14 − max(a, b) − 1 | | |
| 2 | 11 | 11 | 10 | 9 |
| 3 | 10 | 10 | 10 | 9 |

Before obtaining the start time of the eNB pre-sending the relay link information and the start time of the RN pre-receiving the relay link information, the eNB may perform priority configuration on the number of PDCCH of the eNB subframe according to the configured OFDM symbol number used by the PDCCH of the MBSFN subframe where the relay link of the RN is located, and generate priority configuration information.

When relay link resources need to be increased or the eNB does not need to send many PDCCHs in the eNB subframe, the eNB uses the priority configuration information as a reference factor when determining the number of the PDCCH of the eNB subframe. For example, as can be seen from Table 4, when the OFDM symbol number used by the PDCCH of the MBSFN subframe where the relay link of the RN is located is 1, the priority of the OFDM symbol number used by the PDCCH of the eNB is 1=2>3>4; when the OFDM symbol number used by the PDCCH of the MBSFN subframe where the relay link of the RN is located is 2, the priority of the OFDM symbol number used by the PDCCH of the eNB is 1=2=3>4.

As can be seen from Table 4, when the RN reports, to the eNB, the OFDM symbol number actually used by the PDCCH of the MBSFN subframe where the relay link of the RN is located, the OFDM symbol number used by the PDCCH of the MBSFN subframe where the relay link of the RN is located is 1, and when the OFDM symbol number used by the PDCCH of the subframe of the eNB where the relay link is located is 1 or 2, the relay link resources are 11 OFDM symbols, greater than the relay link resources in a situation that the RN sets the OFDM symbol number used by the PDCCH of the MBSFN subframe where the relay link of the RN is located as 2, thereby further increasing the relay link resources.

In this embodiment, relay link resources are configured according to an offset of an RN frame relative to initial synchronization timing between the RN frame and an eNB frame, the number that is reported by the RN and is of the OFDM symbol used by a PDCCH of an MBSFN subframe where a relay link of the RN is located, and the length of a PDCCH in an eNB subframe, in which the value of the offset is 0 OFDM symbol and is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

Figure 6:
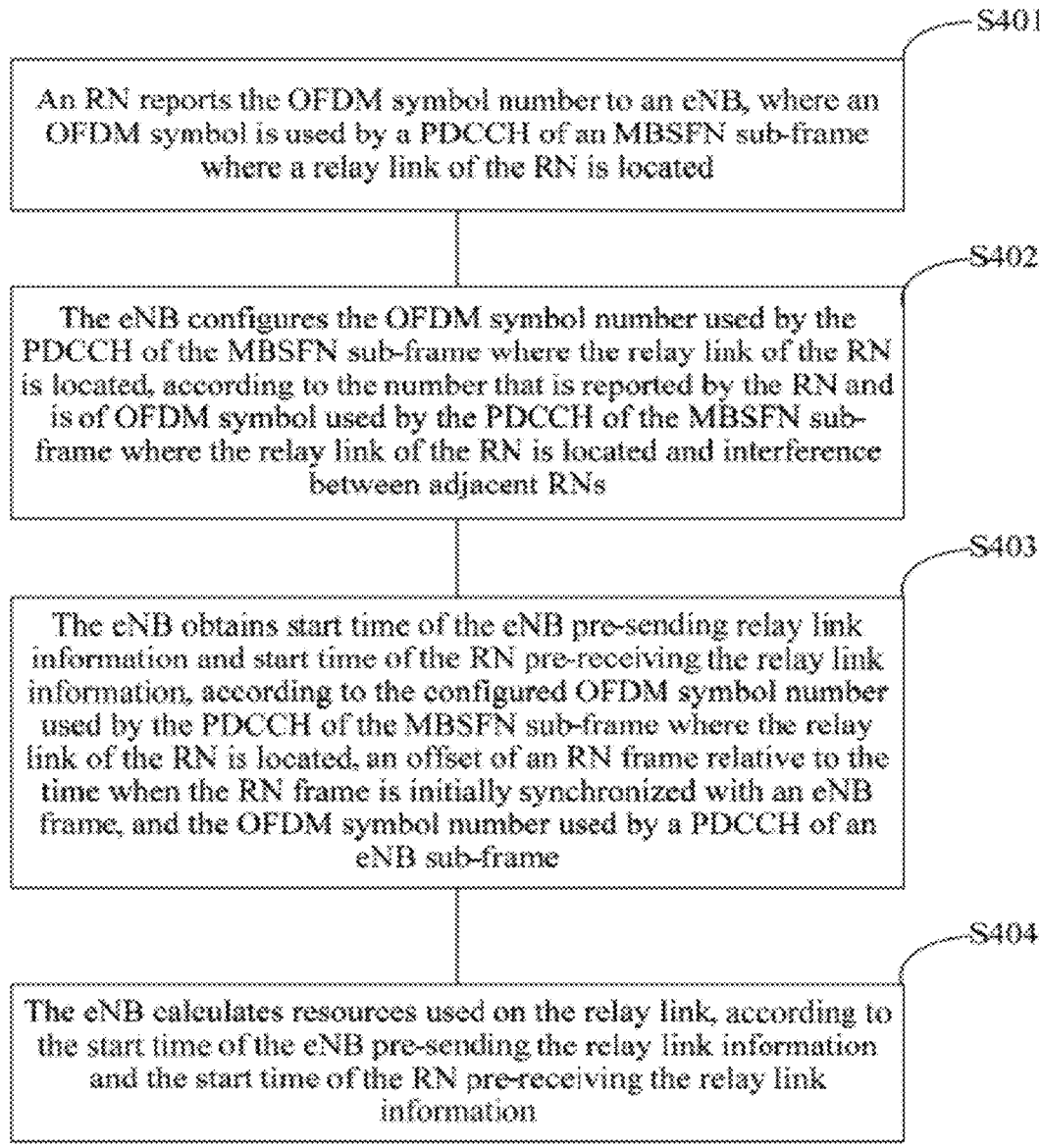
FIG. 6 is a flow chart of yet another method of configuring relay link resources provided in an embodiment of the present invention.

Referring to FIG. 6, it is a flow chart of yet another method of configuring relay link resources provided in an embodiment of the present invention. As shown in FIG. 6, the process of the method of configuring relay link resources includes the following steps.

S401: An RN reports the OFDM symbol number to an eNB, where an OFDM symbol is used by a PDCCH of an MBSFN subframe where a relay link of the RN is located.

S401 is similar to S201 and will not be described herein, and reference can be made to S201.

S402: The eNB configures the OFDM symbol number used by the PDCCH of the MBSFN subframe where the relay link of the RN is located, according to the number that is reported by the RN and is of the OFDM symbol used by the PDCCH of the MBSFN subframe where the relay link of the RN is located and interference between adjacent RNs.

S402 is similar to S202 and will not be described herein, and reference can be made to S202.

S403: The eNB obtains start time of the eNB pre-sending relay link information and start time of the RN pre-receiving the relay link information, according to the configured OFDM symbol number used by the PDCCH of the MBSFN subframe where the relay link of the RN is located, an offset of an RN frame relative to the time when the RN frame is initially synchronized with a base station eNB frame, and the OFDM symbol number used by a PDCCH of an eNB subframe.

In the embodiment of the present invention, the eNB may pre-appoint or configure a first idle time of the RN according to the offset. The first idle time is as follows.

When the value of the offset is between 0 and 1 OFDM symbol (not including 0 OFDM symbol and 1 OFDM symbol), and when the offset is a positive value, the length of the first idle time is the offset.

The eNB obtains the start time of the RN pre-receiving the relay link information, according to the OFDM symbol and the first idle time; and the eNB obtains the start time of the eNB pre-sending the relay link information, according to the length of the PDCCH of the eNB subframe.

In this embodiment, the offset is that the RN frame is offset by positive 0.5 OFDM symbol relative to the time when the RN frame is initially synchronized with the eNB frame, that is, the RN frame is offset forward by 0.5 OFDM symbol relative to the time when the RN frame is initially synchronized with the eNB frame, or an access link of the RN frame is offset forward by 0.5 OFDM symbol relative to the time of initial synchronization of the RN frame, or the access link of the RN frame is offset forward by 0.5 OFDM symbol relative to a relay link of the RN frame.

Accordingly, after the RN is initially synchronized with the eNB, the RN frame is offset forward by 0.5 OFDM symbol relative to the time when the RN frame is initially synchronized with the eNB frame.

The eNB reconfigures the first idle time according to the OFDM symbol, the offset, and the length of the PDCCH of the eNB subframe, so as to ensure that the time when the eNB sends the relay link is the time when the RN receives the relay link, and meanwhile ensure that the OFDM symbol of the relay link of the RN frame after offset keep synchronization with the OFDM symbol of the relay link of the eNB frame or the OFDM symbol following the first idle time keep synchronization with the OFDM symbol of the eNB.

The reconfiguration of the first idle time includes:

when the length of the PDCCH of the RN subframe<the length of the PDCCH of the eNB subframe, setting the first idle time having a length of [the value of the offset+(the length of the PDCCH of the eNB subframe−the length of the PDCCH of the RN subframe)] following the PDCCH of the MBSFN subframe that is for the relay link of the RN; and when the length of the PDCCH of the RN subframe>=the length of the PDCCH of the eNB subframe, setting the first idle time having a length of (1 OFDM symbol−the value of the offset) following the PDCCH of the MBSFN subframe that is for the relay link of the RN.

After the first idle time is reconfigured, the OFDM symbol following the first idle time keeps timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN.

S404: The eNB obtains relay link resources according to the start time of the eNB pre-sending the relay link information and the start time of the RN pre-receiving the relay link information.

It is assumed that the start time of the eNB pre-sending the relay link information starts from an OFDM symbol with a serial number of a, the start time of the RN pre-receiving the relay link information starts from an OFDM symbol with a serial number of b, the relay link resources include f OFDM symbols, f=14−max(a,b)−1, where the value of max(a,b) is a serial number of an OFDM symbol corresponding to the start time of the eNB actually sending the relay link information, and the start time of the eNB actually sending the relay link information is the same as the start time of the RN actually receiving the relay link information.

The start time of the eNB pre-sending the relay link information is counted from 0, 0 represents that the relay link information can be sent from OFDM symbol 0, and so forth; the start time of the RN pre-receiving the relay link information is relative to the eNB subframe, and the time reference of the start time is OFDM symbol 0, 1, 2, . . . , or 13 of the eNB subframe; in the formula f=14−max(a,b)−1, "1" is the state conversion time of the RN with a unit of OFDM symbol.

When the OFDM symbol number reported by the RN is 2, the condition of the relay link resources is shown in Table 5.

TABLE 5

| | a | | | |
|---|---|---|---|---|
| | 1 | 2 | 3 | 4 |
| b | | f = 14 − max(a, b) − 1 | | |
| 2 | 11 | 11 | 10 | 9 |

As can be seen from Table 5, the start time of the RN pre-receiving the relay link information is 2, that is, the start time of the RN pre-receiving the relay link information corresponds to OFDM symbol 2 of the eNB subframe.

When the OFDM symbol number reported by the RN is 2, as compared with the prior art in which the eNB sets the OFDM symbol number used by the PDCCH of the eNB as a maximum of 4, the relay link resources are increased, and the resource waste of a system is reduced, thereby reducing error probability.

When the PDCCH of the MBSFN subframe where the relay link of the RN is located includes the variable number of OFDM symbol, the condition of the relay link resources is shown in Table 6.

TABLE 6

| | a | | | |
|---|---|---|---|---|
| | 1 | 2 | 3 | 4 |
| b | | f = 14 − max(a, b) − 1 | | |
| 1 | 12 | 11 | 10 | 9 |
| 2 | 11 | 11 | 10 | 9 |

Before obtaining the start time of the eNB pre-sending the relay link information and the start time of the RN pre-receiving the relay link information, the eNB may perform priority configuration on the number of PDCCH of the eNB subframe according to the configured OFDM symbol number used by the PDCCH of the MBSFN subframe where the relay link of the RN is located, and generate priority configuration information.

When relay link resources need to be increased or the eNB does not need to send many PDCCHs in the subframe, the eNB uses the priority configuration information as a reference factor when determining the number of the PDCCH of the eNB subframe. For example, as can be seen from Table 6, when the OFDM symbol number used by the PDCCH of the MBSFN subframe where the relay link of the RN is located is 1, the priority of the OFDM symbol number used by the PDCCH of the eNB is 1>2>3>4; when the OFDM symbol number used by the PDCCH of the MBSFN subframe where the relay link of the RN is located is 2, the priority of the OFDM symbol number used by the PDCCH of the eNB is 1=2>3>4.

As can be seen from Table 6, when the RN reports, to the eNB, the OFDM symbol number actually used by the PDCCH of the MBSFN subframe where the relay link of the RN is located, the OFDM symbol number used by the PDCCH of the MBSFN subframe where the relay link of the RN is located is 1, and when the OFDM symbol number used by the PDCCH of the subframe of the eNB where the relay link is located is 1, the relay link resources are 12 OFDM symbols, greater than the relay link resources in a situation that the RN sets the OFDM symbol number used by the PDCCH of the MBSFN subframe where the relay link of the RN is located as 2, thereby further increasing the relay link resources.

In this embodiment, relay link resources are configured according to an offset of an RN frame relative to initial synchronization timing between the RN frame and an eNB frame, the number that is reported by the RN and is of the OFDM symbol used by a PDCCH of an MBSFN subframe where a relay link of the RN is located, and the length of a PDCCH in an eNB subframe, in which the value of the offset is 0.5 OFDM symbol and is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

Figure 7:
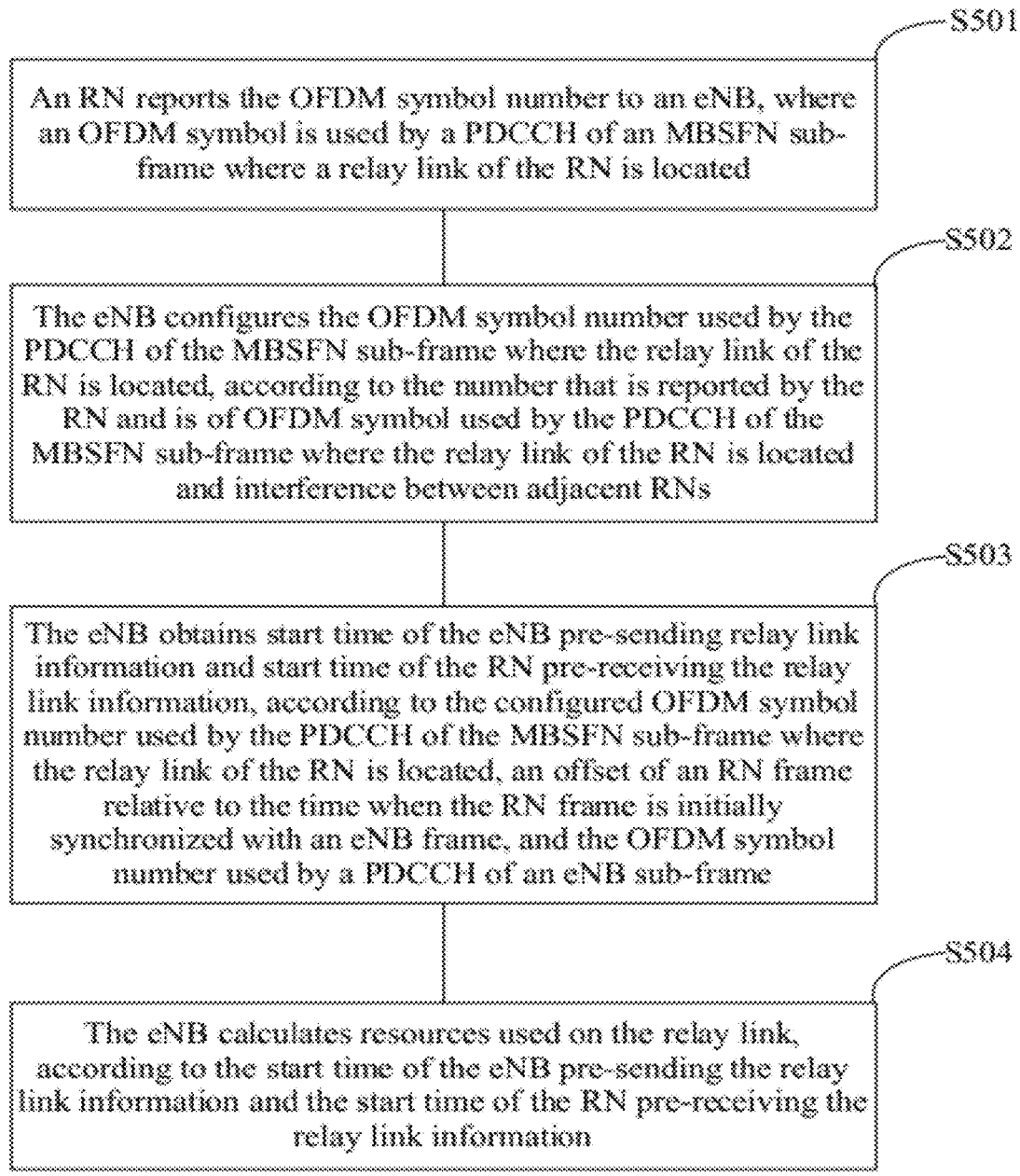
FIG. 7 is a flow chart of yet another method of configuring relay link resources provided in an embodiment of the present invention.

Referring to FIG. 7, it is a flow chart of yet another method of configuring relay link resources provided in an embodiment of the present invention. As shown in FIG. 7, the process of the method of configuring relay link resources includes the following steps.

S501: An RN reports the OFDM symbol number to an eNB, where an OFDM symbol is used by a PDCCH of an MBSFN subframe where a relay link of the RN is located.

S501 is similar to S201 and will not be described herein, and reference can be made to S201.

S502: The eNB configures the OFDM symbol number used by the PDCCH of the MBSFN subframe where the relay link of the RN is located, according to the number that is reported by the RN and is of the OFDM symbol used by the PDCCH of the MBSFN subframe where the relay link of the RN is located and interference between adjacent RNs.

S502 is similar to S202 and will not be described herein, and reference can be made to S202.

S503: The eNB obtains start time of the eNB pre-sending relay link information and start time of the RN pre-receiving the relay link information, according to the configured OFDM symbol number used by the PDCCH of the MBSFN subframe where the relay link of the RN is located, an offset of an RN frame relative to the time when the RN frame is initially synchronized with a base station eNB frame, and the OFDM symbol number used by a PDCCH of an eNB subframe.

In the embodiment of the present invention, the eNB may pre-appoint or configure a first idle time of the RN according to the offset. The first idle time is as follows.

When the value of the offset is 1 OFDM symbol, the length of the first idle time is 1 OFDM symbol.

The eNB obtains the start time of the RN pre-receiving the relay link information, according to the OFDM symbol and the first idle time; and the eNB obtains the start time of the eNB pre-sending the relay link information, according to the length of the PDCCH of the eNB subframe.

In this embodiment, the offset is that the RN frame is offset by positive 1 OFDM symbol relative to the time when the RN frame is initially synchronized with the eNB frame, that is, the RN frame is offset forward by 1 OFDM symbol relative to the time when the RN frame is initially synchronized with the eNB frame, or an access link of the RN frame is offset forward by 1 OFDM symbol relative to the time of initial synchronization of the RN frame, or the access link of the RN frame is offset forward by 1 OFDM symbol relative to timing of a relay link of the RN frame.

Accordingly, after the RN is initially synchronized with the eNB, the RN frame is offset forward by 1 OFDM symbol relative to the time when the RN frame is initially synchronized with the eNB frame, or the access link of the RN frame is offset forward by 1 OFDM symbol relative to the time of initial synchronization of the RN frame, or the access link of the RN frame is offset forward by 1 OFDM symbol relative to timing of the relay link of the RN frame.

According to specifications of an LTE standard, the length of a PDCCH of an eNB subframe may be 1, 2, 3, or 4 OFDM symbols, and the length of a PDCCH of an MBSFN subframe where a relay link of an RN is located may be 1 or 2 OFDM symbols, so 1 OFDM symbol is definitely smaller than the sum of the length of the PDCCH of the MBSFN subframe where the relay link of the RN is located and the first idle time.

The eNB reconfigures the first idle time according to the OFDM symbol, the offset, and the length of the PDCCH of the eNB subframe, so that the time when the RN actually receives the relay link information is the same as the time when the eNB actually sends the relay link information.

The reconfiguration of the first idle time includes:

when the length of the PDCCH of the RN subframe>=the length of the PDCCH of the eNB subframe, setting the first idle time having a length of the offset following the PDCCH of the MBSFN subframe that is for the relay link of the RN; and when the length of the PDCCH of the RN subframe<the length of the PDCCH of the eNB subframe, setting the first idle time having a length of [the value of the offset+(the length of the PDCCH of the eNB subframe−the length of the PDCCH of the RN subframe)] following the PDCCH of the MBSFN subframe that is for the relay link of the RN.

After the first idle time is reconfigured, the OFDM symbol following the first idle time keep timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN.

S504: The eNB obtains relay link resources according to the start time of the eNB pre-sending the relay link information and the start time of the RN pre-receiving the relay link information.

It is assumed that the start time of the eNB pre-sending the relay link information starts from an OFDM symbol with a serial number of a, the start time of the RN pre-receiving the relay link information starts from an OFDM symbol with a serial number of b, the relay link resources include f OFDM symbols, f=14−max(a,b)−2, where the value of max(a,b) is a serial number of an OFDM symbol corresponding to the start time of the eNB actually sending the relay link information, and the start time of the eNB actually sending the relay link information is the same as the start time of the RN actually receiving the relay link information.

The start time of the eNB pre-sending the relay link information is counted from 0, 0 represents that the relay link information can be sent from OFDM symbol 0, and so forth; the start time of the RN pre-receiving the relay link information is relative to the eNB subframe, and the time reference of the start time is OFDM symbol 0, 1, 2, . . . , or 13 of the eNB subframe.

When the OFDM symbol number reported by the RN is 2, the condition of the relay link resources is shown in Table 7.

TABLE 7

| b | a | | | |
|---|---|---|---|---|
|   | 1 | 2 | 3 | 4 |
|   |   | f = 14 − max(a, b) − 2 | | |
| 2 | 10 | 10 | 9 | 8 |

When the OFDM symbol number reported by the RN is 2, as compared with the prior art in which the eNB sets the OFDM symbol number used by the PDCCH of the eNB as a maximum of 4, the relay link resources are increased, and the resource waste of a system is reduced, thereby reducing error probability.

When the PDCCH of the MBSFN subframe where the relay link of the RN is located includes the variable number of OFDM symbol, the condition of the relay link resources is shown in Table 8.

TABLE 8

| b | a | | | |
|---|---|---|---|---|
|   | 1 | 2 | 3 | 4 |
|   |   | f = 14 − max(a, b) − 2 | | |
| 1 | 11 | 10 | 9 | 8 |
| 2 | 10 | 10 | 9 | 8 |

Before obtaining the start time of the eNB pre-sending the relay link information and the start time of the RN pre-receiving the relay link information, the eNB may perform priority configuration on the number of PDCCH of the eNB subframe according to the configured OFDM symbol number used by the PDCCH of the MBSFN subframe where the relay link of the RN is located, and generate priority configuration information.

When relay link resources need to be increased or the eNB does not need to send many PDCCHs in the eNB subframe, the eNB uses the priority configuration information as a reference factor when determining the number of the PDCCH of the eNB subframe. For example, as can be seen from Table 8, when the OFDM symbol number used by the PDCCH of the MBSFN subframe where the relay link of the RN is located is 1, the priority of the OFDM symbol number used by the PDCCH of the eNB is 1>2>3>4; when the OFDM symbol number used by the PDCCH of the MBSFN subframe where the relay link of the RN is located is 2, the priority of the OFDM symbol number used by the PDCCH of the eNB is 1=2>3>4.

As can be seen from Table 8, when the RN reports, to the eNB, the OFDM symbol number actually used by the PDCCH of the MBSFN subframe where the relay link of the RN is located, the OFDM symbol number used by the PDCCH of the MBSFN subframe where the relay link of the RN is located is 1, and when the OFDM symbol number used by the PDCCH of the subframe of the eNB where the relay link is located is 1, the relay link resources are 11 OFDM symbols, greater than the relay link resources in a situation that the RN sets the OFDM symbol number used by the PDCCH of the MBSFN subframe where the relay link of the RN is located as 2, thereby further increasing the relay link resources.

In this embodiment, relay link resources are configured according to an offset of an RN frame relative to initial synchronization timing between the RN frame and an eNB frame, the number that is reported by the RN and is of OFDM symbol used by a PDCCH of an MBSFN subframe where a relay link of the RN is located, and the length of a PDCCH in an eNB subframe, in which the value of the offset is 1 OFDM symbol and is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

Figure 8:
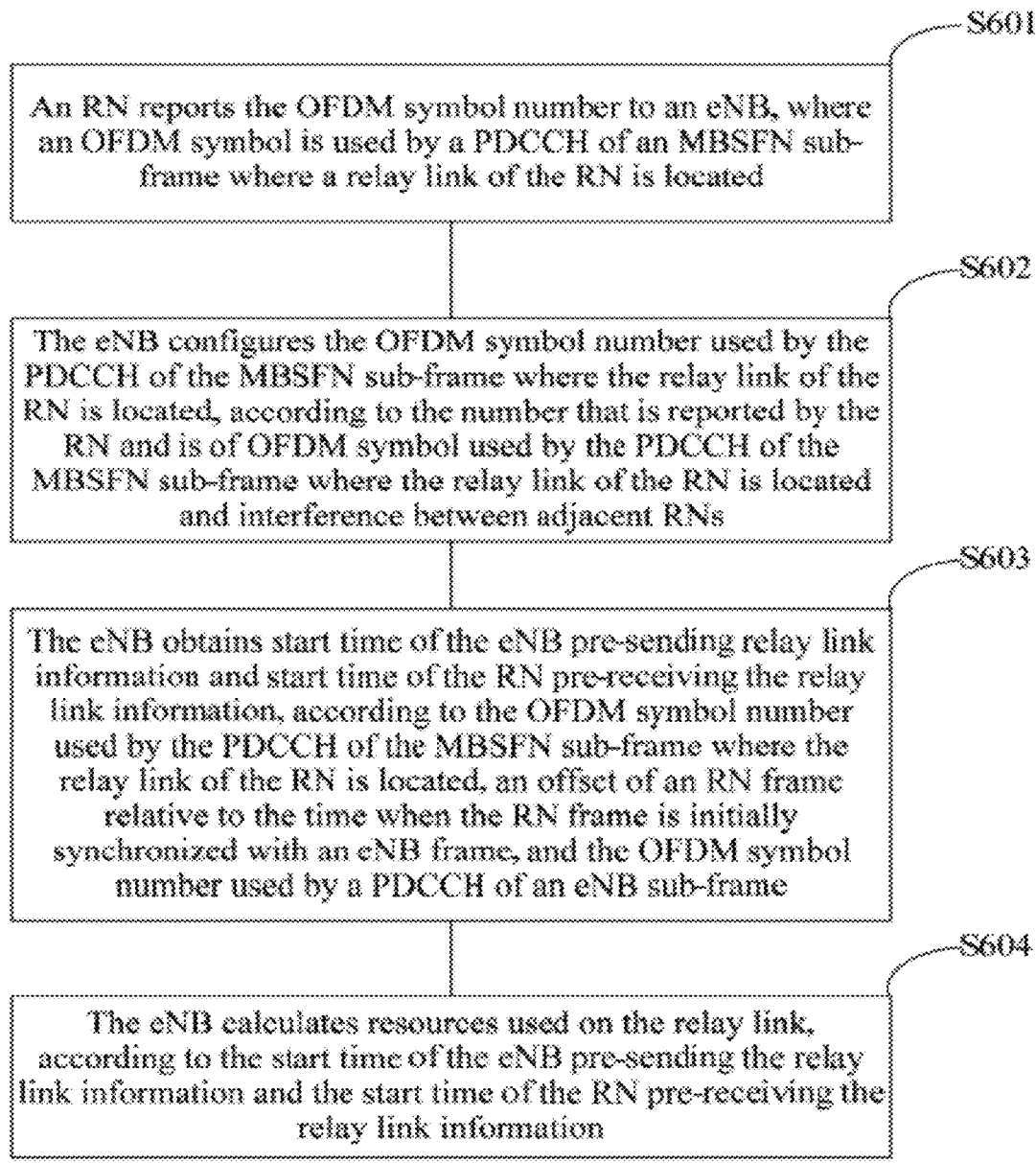
FIG. 8 is a flow chart of yet another method of configuring relay link resources provided in an embodiment of the present invention.

Referring to FIG. 8, it is a flow chart of yet another method of configuring relay link resources provided in an embodiment of the present invention. As shown in FIG. 8, the process of the method of configuring relay link resources includes the following steps.

S601: An RN reports the OFDM symbol number to an eNB, where an OFDM symbol is used by a PDCCH of an MBSFN subframe where a relay link of the RN is located.

S601 is similar to S201 and will not be described herein, and reference can be made to S201.

S602: The eNB configures the OFDM symbol number used by the PDCCH of the MBSFN subframe where the relay link of the RN is located, according to the number that is reported by the RN and is of the OFDM symbol used by the PDCCH of the MBSFN subframe where the relay link of the RN is located and interference between adjacent RNs.

S602 is similar to S202 and will not be described herein, and reference can be made to S202.

S603: The eNB obtains start time of the eNB pre-sending relay link information and start time of the RN pre-receiving the relay link information, according to the configured OFDM symbol number used by the PDCCH of the MBSFN subframe where the relay link of the RN is located, an offset of an RN frame relative to the time when the RN frame is initially synchronized with a base station eNB frame, and the OFDM symbol number used by a PDCCH of an eNB subframe.

In the embodiment of the present invention, the eNB may pre-appoint or configure a first idle time of the RN according to the offset. The first idle time is as follows.

When the value of the offset is 1 OFDM symbol, the length of the first idle time is 1 OFDM symbol.

The eNB obtains the start time of the RN pre-receiving the relay link information, according to the OFDM symbol and the first idle time; and the eNB obtains the start time of the eNB pre-sending the relay link information, according to the length of the PDCCH of the eNB subframe.

In this embodiment, the offset is that the RN frame is offset by negative 1 OFDM symbol relative to the time when the RN frame is initially synchronized with the eNB frame, that is, the RN frame is offset backward by 1 OFDM symbol relative to the time when the RN frame is initially synchronized with the eNB frame, or an access link of the RN frame is offset backward by 1 OFDM symbol relative to the time of initial synchronization of the RN frame, or the access link of the RN frame is offset backward by 1 OFDM symbol relative to timing of a relay link of the RN frame.

Accordingly, after the RN is initially synchronized with the eNB, the RN frame is offset backward by 1 OFDM symbol relative to the time when the RN frame is initially synchronized with the eNB frame, or the access link of the RN frame is offset backward by 1 OFDM symbol relative to the time of initial synchronization of the RN frame, or the access link of the RN frame is offset backward by 1 OFDM symbol relative to timing of the relay link of the RN frame.

The eNB reconfigures the first idle time according to the OFDM symbol, the offset, and the length of the PDCCH of the eNB subframe, so that the time when the RN actually receives the relay link information is the same as the time when the eNB actually sends the relay link information.

The reconfiguration of the first idle time includes:

when the length of the PDCCH of the RN subframe>=the length of the PDCCH of the eNB subframe, setting the first idle time having a length of the offset following the PDCCH of the MBSFN subframe that is for the relay link of the RN; and when the length of the PDCCH of the RN subframe<the length of the PDCCH of the eNB subframe, if the PDCCH of the MBSFN subframe for the relay link of the RN is 1 OFDM symbol, and the PDCCH of the eNB is 4 OFDM symbols, setting the first idle time having a length of 2 OFDM symbols following the PDCCH of the MBSFN subframe that is for the relay link of the RN; in other situations, setting the first idle time having a length of 1 OFDM symbol following the PDCCH of the MBSFN subframe that is for the relay link of the RN. After the first idle time is set, the OFDM symbol following the first idle time keep timing synchronization with the OFDM symbol of the eNB, or timing of the OFDM symbol following the first idle time is aligned with timing of the OFDM symbol used when the RN is initially synchronized with the eNB; and second idle time is located at the end of the MBSFN subframe of the relay link of the RN.

S604: The eNB obtains relay link resources according to the start time of the eNB pre-sending the relay link information and the start time of the RN pre-receiving the relay link information.

It is assumed that the start time of the eNB pre-sending the relay link information starts from an OFDM symbol with a serial number of a, the start time of the RN pre-receiving the relay link information starts from an OFDM symbol with a serial number of b, the relay link resources include f OFDM symbols, and f=14−max(a,b). The start time of the eNB pre-sending the relay link information is counted from 0, 0 represents that the relay link information can be sent from OFDM symbol 0, and so forth; the start time of the RN pre-receiving the relay link information is relative to the eNB subframe, and the time reference of the start time is OFDM symbol 0, 1, 2, . . . , or 13 of the eNB subframe.

When the OFDM symbol number reported by the RN is 2, the condition of the relay link resources is shown in Table 9.

TABLE 9

| | a | | | |
|---|---|---|---|---|
| b | 1 | 2 | 3 | 4 |
| | f = 14 − max(a, b) | | | |
| 4 | 10 | 10 | 10 | 10 |

As can be seen from Table 9, the start time of the RN pre-receiving the relay link information is 4, that is, the start time of the RN pre-receiving the relay link information corresponds to OFDM symbol 4 of the eNB subframe.

When the OFDM symbol number reported by the RN is 2, as compared with the prior art in which the eNB sets the OFDM symbol number used by the PDCCH of the eNB as a maximum of 4, the relay link resources are increased, and the resource waste of a system is reduced, thereby reducing error probability.

When the PDCCH of the MBSFN subframe where the relay link of the RN is located includes the variable number of OFDM symbol, the condition of the relay link resources is shown in Table 10.

TABLE 10

| | a | | | |
|---|---|---|---|---|
| b | 1 | 2 | 3 | 4 |
| | f = 14 − max(a, b) | | | |
| 3 | 11 | 11 | 11 | 10 |
| 4 | 10 | 10 | 10 | 10 |

Before obtaining the start time of the eNB pre-sending the relay link information and the start time of the RN pre-receiving the relay link information, the eNB may perform priority configuration on the number of PDCCH of the eNB subframe according to the configured OFDM symbol number used by the PDCCH of the MBSFN subframe where the relay link of the RN is located, and generate priority configuration information.

When relay link resources need to be increased or the eNB does not need to send many PDCCHs in the eNB subframe, the eNB uses the priority configuration information as a reference factor when determining the number of the PDCCH of the eNB subframe. For example, as can be seen from Table 10, when the OFDM symbol number used by the PDCCH of the MBSFN subframe where the relay link of the RN is located is 1, the priority of the OFDM symbol number used by the PDCCH of the eNB is 1=2=3>4; when the OFDM symbol number used by the PDCCH of the MBSFN subframe where the relay link of the RN is located is 2, the priority of the OFDM symbol number used by the PDCCH of the eNB is 1=2=3=4.

As can be seen from Table 10, when the RN reports, to the eNB, the OFDM symbol number actually used by the PDCCH of the MBSFN subframe where the relay link of the RN is located, the OFDM symbol number used by the PDCCH of the MBSFN subframe where the relay link of the RN is located is 1, and when the OFDM symbol number used by the PDCCH of the subframe of the eNB where the relay link is located is 1, 2, or 3, the relay link resources are 11 OFDM symbols, greater than the relay link resources in a situation that the RN sets the OFDM symbol number used by the PDCCH of the MBSFN subframe where the relay link of the RN is located as 2, thereby further increasing the relay link resources.

In this embodiment, relay link resources are configured according to an offset of an RN frame relative to initial synchronization timing between the RN frame and an eNB frame, the number that is reported by the RN and is of the OFDM symbol used by a PDCCH of an MBSFN subframe where a relay link of the RN is located, and the length of a PDCCH in an eNB subframe, in which the value of the offset is 1 OFDM symbol and is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

In the above embodiments of the method of configuring relay link resources provided in the embodiments of the present invention, the eNB may further map/allocate data information (information borne on an R_PDSCH) or control information (information borne on at least one of the following channels: an R_PDCCH, an R_PCFICH, and/or an R_PHICH) for the relay link of the RN according to the configured OFDM symbol number used by the PDCCH of the MBSFN subframe where the relay link of the RN is located.

When the control information is that when all RNs are multiplexed together, the start time of the control information is the latest time value of the start time at which all the RNs are capable of receiving relay link information, or the start time is located at the position of pilot of a cell-specific antenna port of the eNB, for example, at the start time of a $2^{nd}$ slot, and at this time, the cell-specific antenna port of the eNB may be fully utilized for channel estimation. When the control information is RN-specific control information, that is, control information of the RNs is separate/independent from each other. At this time, the start time at which each RN is capable of receiving relay link information is used as the start time to allocate control information (which may be one, two, or all of the R_PDCCH, the R-PCFICH, and the R-PHICH) to the RN; or the start time is located at the position of pilot of a cell-specific antenna port of the eNB, for example, at the start time of a $2^{nd}$ slot, and at this time, the cell-specific antenna port of the eNB may be fully utilized for channel estimation; or the eNB selects a $3^{rd}$ OFDM symbol from the bottom of a $0^{th}$ slot or a $1^{st}$ OFDM symbol of a $1^{st}$ slot in the subframe where the relay link is located as the start position of time domain for placing the R_PDCCH/R_PCFICH. The R_PDCCH that is for each RN and is located in the relay link starts mapping from the time when the RN is capable of receiving information. The R_PDCCH and the R_PDSCH allocated by the eNB to the RN may use time division, frequency division, or both the time division and the frequency division. If the eNB and the RN make a pre-appointment to set the OFDM symbol number used by the PDCCH of the MBSFN subframe where the relay link of the RN is located as 1 or 2, the RN does not need to report the OFDM symbol number used by the PDCCH of the MBSFN subframe where the relay link of the RN is located, and the eNB can perform subsequent processing according to the pre-appointed OFDM symbol number used by the PDCCH of the MBSFN subframe where the relay link of the RN is located.

In the above embodiments of the method of configuring relay link resources provided in the embodiments of the present invention, the eNB may not directly inform the RN of the offset value, but inform the RN of the time between a sending start time of an access link (a communication link from the RN to a UE under the coverage of the RN) of the RN to a receiving end time of the relay link of the RN, so as to indirectly obtain the offset value of the access link relative to the relay link or relative to the time when the relay node frame is initially synchronized with the base station frame, that is, the offset value of the RN frame relative to the time when the RN frame is initially synchronized with the eNB frame.

Based on the above method of configuring relay link resources, embodiments of the present invention further provide a base station and a system of configuring relay link resources.

Figure 9:
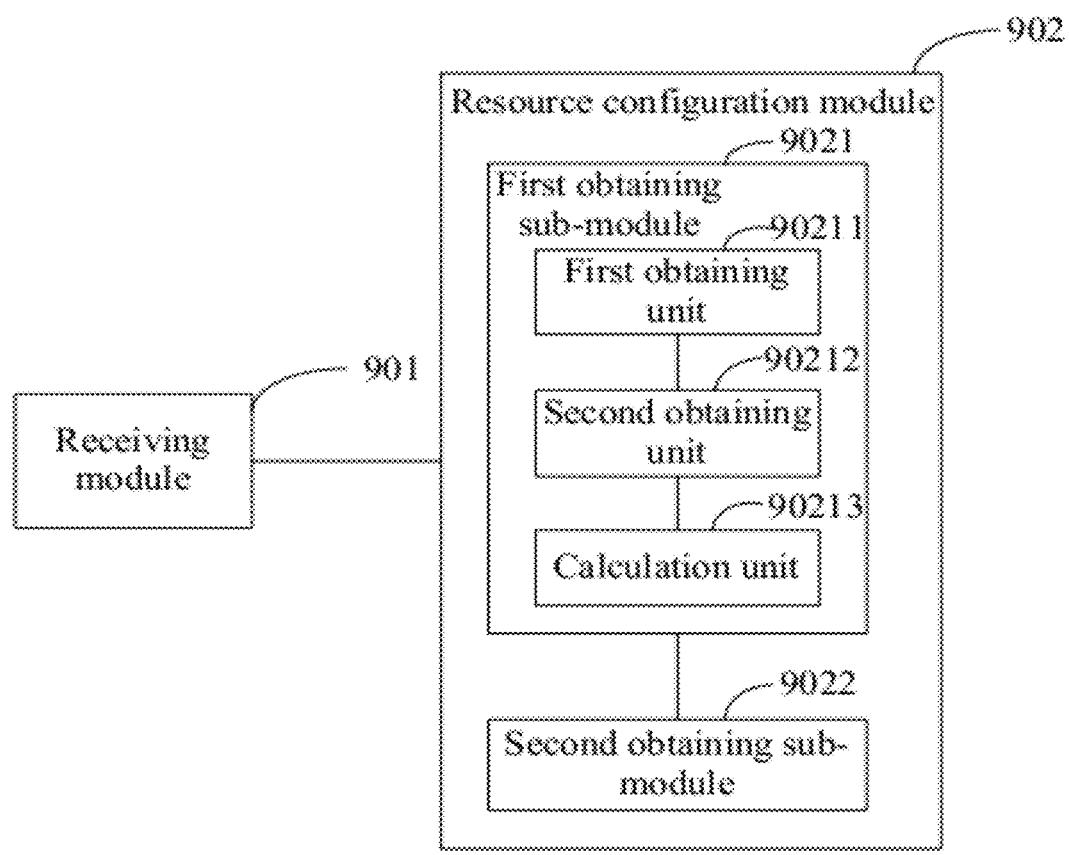
FIG. 9 is a schematic block diagram of a base station provided in an embodiment of the present invention.

FIG. 9 is a schematic block diagram of a base station provided in an embodiment of the present invention. The base station includes:

A receiving module 901, which is configured to receive an orthogonal frequency division multiplexing OFDM symbol number reported by a relay node RN, in which the OFDM symbol is used by a physical downlink control channel PDCCH of a multimedia multicast broadcast single frequency network MBSFN subframe where a relay link of the RN is located.

A resource configuration module 902, which is configured to configure relay link resources according to the OFDM symbol number and an offset, in which the offset is an offset of an RN frame relative to the time when the RN frame is initially synchronized with a base station eNB frame, and is smaller than a sum of a length of the PDCCH of the MBSFN subframe where the relay link of the RN is located and a first idle time, and the offset is used to set the first idle time following the PDCCH of the MBSFN in an RN subframe, and keep synchronization between OFDM symbol of the relay link following the first idle time and OFDM symbol of the relay link of the eNB frame, and the first idle time immediately follows the PDCCH of the RN subframe.

The resource configuration module 902 may include:

A first obtaining sub-module 9021, which is configured to obtain start time of the eNB actually sending relay link information, according to the OFDM symbol number, the offset, and a length of a PDCCH in the eNB subframe, in which the start time of the eNB actually sending the relay link information is the same as start time of the RN actually receiving the relay link information.

A second obtaining sub-module 9022, which is configured to obtain the relay link resources according to the start time of the eNB actually sending the relay link information.

The first obtaining sub-module 9021 may include:

A first obtaining unit 90211, which is configured to obtain start time of the RN pre-receiving the relay link information, according to the OFDM symbol number and the offset.

A second obtaining unit 90212, which is configured to obtain start time of the eNB pre-sending the relay link information, according to the length of the PDCCH in the eNB subframe.

A calculation unit 90213, which is configured to take a maximum of the start time of the RN pre-receiving the relay link information and the start time of the eNB pre-sending the relay link information to serve as the start time of the eNB actually sending the relay link information, that is, the start time of the RN actually receiving the relay link information.

Figure 10:
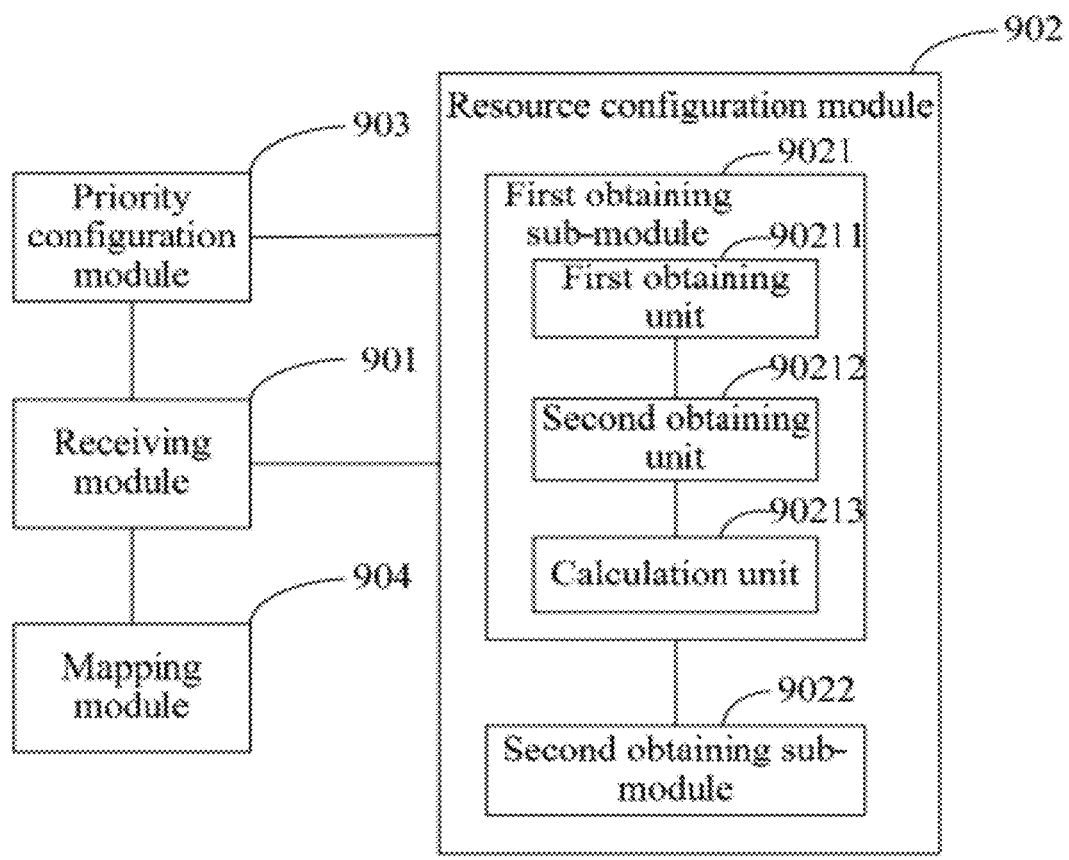
FIG. 10 is a schematic block diagram of another base station provided in an embodiment of the present invention.

It should be further noted that, based on the embodiments of the present invention, the base station may further include a priority configuration module 903 and a mapping module 904. As shown in FIG. 10, FIG. 10 is a schematic block diagram of another base station provided in an embodiment of the present invention.

The priority configuration module 903 is configured to perform priority configuration on the number of PDCCH of the eNB subframe according to the number that is reported by the RN and is of the OFDM symbol used by the PDCCH of the MBSFN subframe where the relay link of the RN is located, generate priority configuration information, and send the priority configuration information to the resource configuration module 902.

The mapping module 904 is configured to map or allocate data information or map or allocate control information for the relay link of the RN according to the OFDM symbol number, in which the data information includes information borne on a relay_physical downlink shared channel R_PDSCH, and the control information includes information borne on at least one of the following three channels: a relay_physical downlink control channel R_PDCCH, a relay_physical control format indicator channel R_PCFICH, and a relay_physical hybrid automatic retransmission indicator channel R_PHICH.

Figure 11:
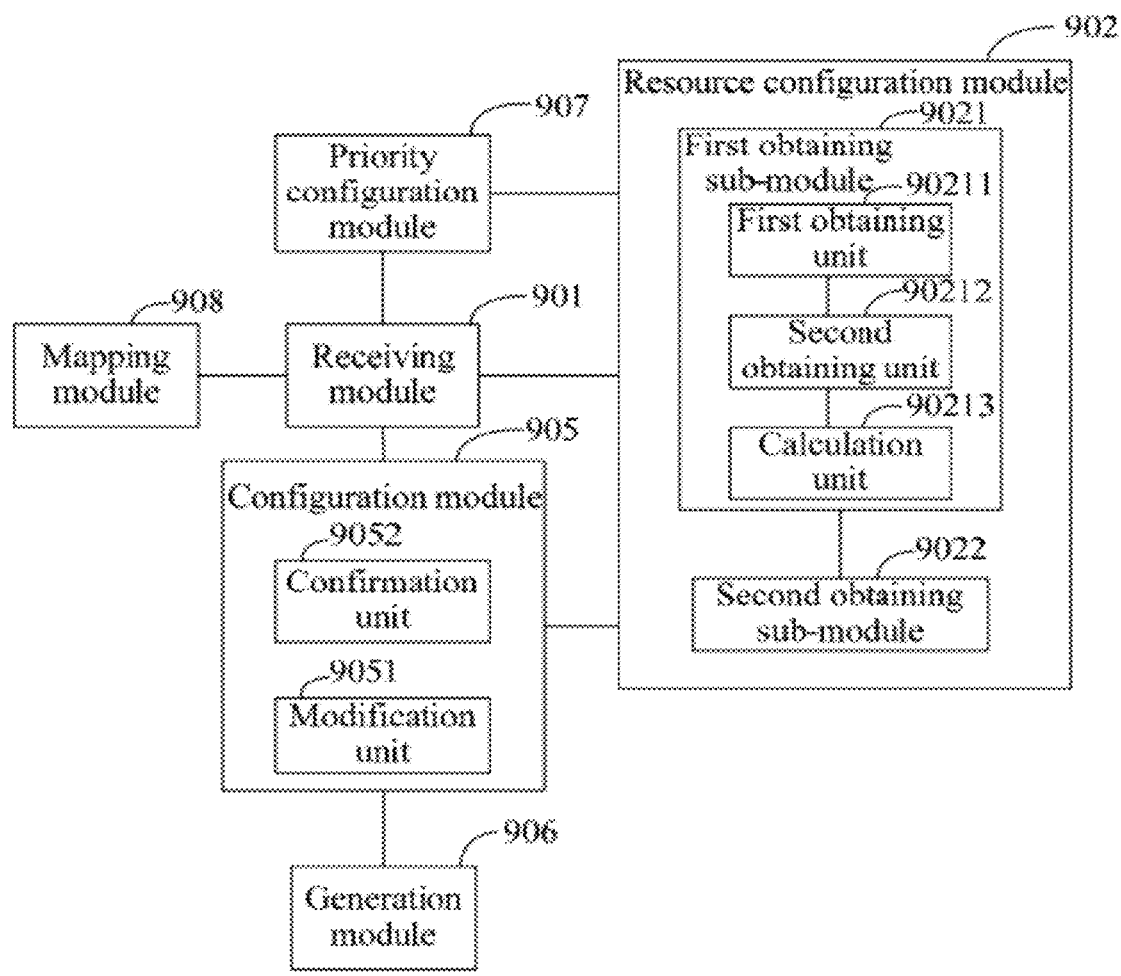
FIG. 11 is a schematic block diagram of yet another base station provided in an embodiment of the present invention.

It should be further noted that, based on the embodiments of the present invention, the base station may further include a configuration module 905, a generation module 906, a priority configuration module 907, and a mapping module 908. As shown in FIG. 11, FIG. 11 is a schematic block diagram of yet another base station provided in an embodiment of the present invention.

The configuration module 905 is configured to configure, according to interference between adjacent RNs, the OFDM symbol number used by the PDCCH of the MBSFN subframe where the relay link of the RN is located, and send, to the resource configuration module 902, the configured OFDM symbol number used by the PDCCH of the MBSFN subframe where the relay link of the RN is located.

The configuration module 905 may include a modification unit 9051 or a confirmation unit 9052.

The modification unit 9051 is configured to, if the interference between the adjacent RNs is greater than a predetermined interference value and the OFDM symbol number used by the PDCCH of the MBSFN subframe where the relay link of the RN is located is 1, configure the OFDM symbol number used by the PDCCH of the MBSFN subframe where the relay link of the RN is located as 2.

The confirmation unit 9052 is configured to, if the interference between the adjacent RNs is smaller than the predetermined interference value, or the interference between the adjacent RNs is greater than the predetermined interference value and the OFDM symbol number used by the PDCCH of the MBSFN subframe where the relay link of the RN is located is 2, keep the OFDM symbol number used by the PDCCH of the MBSFN subframe where the relay link of the RN is located unchanged.

The generation module 906 is configured to generate indication information according to the configured OFDM symbol number used by the PDCCH of the MBSFN subframe where the relay link of the RN is located, and send the indication information to the RN.

The indication information includes modification information or confirmation information, the modification information represents that the OFDM symbol number used by the PDCCH of the MBSFN subframe where the relay link of the RN is located is configured as 2, and the confirmation information represents that the OFDM symbol number used by the PDCCH of the MBSFN subframe where the relay link of the RN is located is kept unchanged.

The priority configuration module 907 is configured to perform priority configuration on the number of PDCCH of the eNB subframe according to the configured OFDM symbol number used by the PDCCH of the MBSFN subframe where the relay link of the RN is located, generate priority configuration information, and send the priority configuration information to the obtaining module 901.

The mapping module 908 is configured to map or allocate data information or map or allocate control information for the relay link of the RN according to the configured OFDM symbol number used by the PDCCH of the MBSFN subframe where the relay link of the RN is located, in which the data information includes information borne on a relay_physical downlink shared channel R_PDSCH, and the control information includes information borne on a relay_physical downlink control channel R_PDCCH, a relay_physical control format indicator channel R_PCFICH, and/or a relay_physical hybrid automatic retransmission indicator channel R_PHICH.

Figure 12:
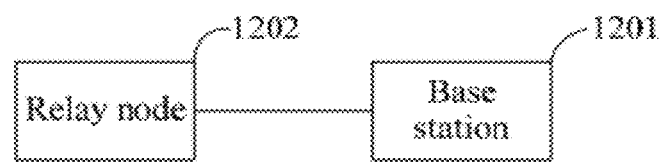
FIG. 12 is a block diagram of an embodiment of a system of configuring relay link resources provided in an embodiment of the present invention.

FIG. 12 is a block diagram of an embodiment of a system of configuring relay link resources provided in an embodiment of the present invention. The system of configuring relay link resources includes:

A base station 1201, which is configured to receive an orthogonal frequency division multiplexing OFDM symbol number reported by the relay node RN, in which the OFDM symbol is used by a physical downlink control channel PDCCH of a multimedia multicast broadcast single frequency network MBSFN subframe where a relay link of the RN is located; and configure relay link resources according to the OFDM symbol number and an offset, in which the offset is an offset of an RN frame relative to the time when the RN frame is initially synchronized with a base station eNB frame, and is smaller than a sum of a length of the PDCCH of the MBSFN subframe where the relay link of the RN is located and a first idle time, and the offset is used to set the first idle time following the PDCCH of the MBSFN in an RN subframe, and keep synchronization between the OFDM symbol of the relay link following the first idle time and the OFDM symbol of the relay link of the eNB frame, and the first idle time immediately follows the PDCCH of the RN subframe.

The base station 1201 may further be configured to configure, according to interference between adjacent RNs, the OFDM symbol number used by the PDCCH of the MBSFN subframe where the relay link of the RN is located; generate indication information according to the configured OFDM symbol number used by the PDCCH of the MBSFN subframe where the relay link of the RN is located, and send the indication information to the RN; perform priority configuration on the number of PDCCH of the eNB subframe according to the number that is reported by the RN and is of the OFDM symbol used by the PDCCH of the MBSFN subframe where the relay link of the RN is located, and generate priority configuration information; and map or allocate data information or map or allocate control information for the relay link of the RN according to the OFDM symbol number, in which the data information includes information borne on a relay_physical downlink shared channel R_PDSCH, and the control information includes information borne on at least one of the following three channels: a relay_physical downlink control channel R_PDCCH, a relay_physical control format indicator channel R_PCFICH, and a relay_physical hybrid automatic retransmission indicator channel R_PHICH.

A relay node 1202, which is configured to perform initial synchronization timing with the base station eNB, and offset the RN frame relative to the time when the RN frame is initially synchronized with the eNB frame, according to the offset of the RN frame relative to the time when the RN frame is initially synchronized with the eNB frame; and report, to the eNB, an orthogonal frequency division multiplexing OFDM symbol number used by the PDCCH of the MBSFN subframe where the relay link of the RN is located.

The relay node 1202 may further be configured to receive notification signaling sent by the eNB, in which the notification signaling includes the preset offset of the RN frame relative to initial synchronization timing between the RN frame and an eNB frame; and set the OFDM symbol number used by the PDCCH of the MBSFN subframe where the relay link of the RN is located as 2.

The device embodiments are described briefly because they are substantially similar to the method embodiments, and for relevant parts, reference can be made to some description of the method embodiments.

In this embodiment, relay link resources are configured according to an offset of an RN frame relative to initial synchronization timing between the RN frame and an eNB frame, the number that is reported by the RN and is of the OFDM symbol used by a PDCCH of an MBSFN subframe where a relay link of the RN is located, and the length of a PDCCH in an eNB subframe, in which the offset is smaller than the sum of the length of the PDCCH of the MBSFN subframe where the relay link of the RN is located and a first idle time. As compared with the prior art, in the embodiment of the present invention, the offset is decreased, so that the relay link resources are increased; and the eNB no longer considers by default the OFDM symbol number used by the PDCCH of the MBSFN subframe where the relay link of the RN is located to be a maximum value, but configures relay link resources according to the actual length of the PDCCH reported by the RN, so as to further increase the relay link resources and reduce resource waste.

Through the description of the preceding embodiments of the present invention, persons skilled in the art may clearly understand that the embodiments of the present invention may be implemented by software plus a necessary universal hardware platform. Based on such understandings, all or part of the technical solutions in the embodiments of the present invention that makes contributions to the prior art may be essentially embodied in the form of a software product. The computer software product may be stored in a storage medium such as a ROM/RAM, a magnetic disk, or an optical disk, and contain several instructions to instruct a computer device (for example, a personal computer, a server, or a network device) to perform the method described in the embodiments of the present invention or in some parts of the embodiments.

The above descriptions are merely exemplary embodiments of the present invention, but not intended to limit the present invention in any form. Although the exemplary embodiments according to the present invention are disclosed as foregoing, they are not intended to limit the present invention. For persons skilled in the art, the technical solutions of the present invention may be improved and modified or may be changed as equivalent embodiments by use of the above-disclosed methods and technical contents without departing from the scope of the technical solutions of the present invention. Therefore, any simple improvement, equivalent change and modification made to the above embodiments according to the technical substantive contents of the present invention without departing from the contents of the technical solutions of the present invention, falls into the protection scope of the technical solutions of the present invention.

What is claimed is:

1. A method of configuring relay link resources, comprising:
   receiving, by a relay node (RN), relay link information on the relay link resources, from a base station, wherein
   the relay link resources start from an orthogonal frequency division multiplexing (OFDM) symbol corresponding to a start time of the RN receiving the relay link information, the OFDM symbol corresponding to the start time of the RN receiving the relay link information is a Kth OFDM symbol in a base station subframe, the relay link resources comprise f OFDM symbols, wherein f=14−K−N, wherein K is a serial number of one of the OFDM symbols comprised in the base station subframe corresponding to a start time of the base station which sends the relay link information, wherein N is an integer and is one of 0, 1 and 2, and a sum of K and N is smaller than 14; and
   wherein the relay link resources are configured according to an OFDM symbol number used by a physical downlink control channel (PDCCH) of a multimedia multicast broadcast single frequency network (MBSFN) subframe where a relay link of the RN is located, an offset, and a length of a PDCCH in the base station subframe, and the offset is a time offset of timing of an access link of an RN frame relative to timing of a relay link of the RN frame.

2. The method according to claim 1, wherein the offset is smaller than a sum of a length of the PDCCH of the MBSFN subframe where the relay link of the RN is located and a first idle time, and one of the OFDM symbols following the first idle time is synchronized with one of the OFDM symbols of an eNB frame.

3. The method according to claim 1, wherein the offset is an integral multiple of a length of a sampling time, a lower limit of the integral multiple of the sampling time in the LTE system is 0, an upper limit is 1 OFDM symbol, and wherein the length of the sampling time equals to 1/30702 ms.

4. A relay node (RN), comprising:
   a receiver, configured to receive relay link information on relay link resources, from a base station, wherein the relay link resources start from an orthogonal frequency division multiplexing (OFDM) symbol corresponding to a start time of the RN receiving the relay link information, the OFDM symbol corresponding to the start time of the RN receiving the relay link information is a Kth OFDM symbol in a base station subframe, the relay link resources comprise f OFDM symbols, wherein f=14−K−N, wherein K is a serial number of one of the OFDM symbols comprised in the base station subframe corresponding to a start time of the base station which sends the relay link information, wherein N is an integer and is one of 0, 1 and 2, and a sum of K and N is smaller than 14; and
   a storage medium, configured to couple the receiver;
   wherein the relay link resources are configured according to an OFDM symbol number used by a physical downlink control channel (PDCCH) of a multimedia multicast broadcast single frequency network (MBSFN) subframe where a relay link of the RN is located an offset and a length of a PDCCH in the base station subframe and the offset is a time offset of timing of an access link of an RN frame relative to timing of a relay link of the RN frame.

5. The relay node according to claim 4, wherein the offset is smaller than a sum of a length of the PDCCH of the MBSFN subframe where the relay link of the RN is located and a first idle time, and one of the OFDM symbols following the first idle time is synchronized with one of the OFDM symbols of an eNB frame.

6. The relay node according to claim 4, wherein the offset is an integral multiple of a length of a sampling time, a lower limit of the integral multiple of the sampling time in the LTE system is 0, an upper limit is 1 OFDM symbol, and wherein the length of the sampling time equals to 1/30702 ms.

7. A system, comprising:
   a relay node (RN), configured to receive relay link information on relay link resources, from a base station, wherein the relay link resources start from an orthogonal frequency division multiplexing (OFDM) symbol corresponding to a start time of the RN receiving the relay link information, the OFDM symbol corresponding to the start time of the RN receiving the relay link information is a Kth OFDM symbol in a base station subframe, the relay link resources comprise f OFDM symbols, wherein f=14−K−N, wherein K is a serial number of one of the OFDM symbols comprised in the base station subframe corresponding to a start time of the base station which sends the relay link information, wherein N is an integer and is one of 0, 1 and 2, and a sum of K and N is smaller than 14; and the base station, configured to send the relay link information on the relay link resources;

wherein the relay link resources are configured according to an OFDM symbol number used by a physical downlink control channel (PDCCH) of a multimedia multicast broadcast single frequency network (MBSFN) subframe where a relay link of the RN is located an offset and a length of a PDCCH in the base station subframe and the offset is a time offset of timing of an access link of an RN frame relative to timing of a relay link of the RN frame.

8. The system according to claim 7, wherein the offset is smaller than a sum of a length of the PDCCH of the MBSFN subframe where the relay link of the RN is located and a first idle time, and one of the OFDM symbols following the first idle time is synchronized with one of the OFDM symbols of an eNB frame.

9. The system according to claim 7, wherein the offset is an integral multiple of a length of a sampling time, a lower limit of the integral multiple of the sampling time in the LTE system is 0, an upper limit is 1 OFDM symbol, and wherein the length of the sampling time equals to 1/30702 ms.

10. The method according to claim 1, when relay physical downlink control channels (R-PDCCH) are multiplexed together, a start time of the R-PDCCHs is a start time of a second slot of the base station subframe.

11. The method according to claim 1, when R-PDCCHs are separate from each other, a start time of each of the R-PDCCHs is a start time of a second slot of the base station subframe.

12. The relay node according to claim 4, when relay physical downlink control channels (R-PDCCHs) are multiplexed together, a start time of the R-PDCCHs is a start time of a second slot of the base station subframe.

13. The relay node according to claim 4, when R-PDCCHs are separate from each other, a start time of each of the R-PDCCHs is a start time of a second slot of the base station subframe.

14. The system according to claim 7, when relay physical downlink control channels (R-PDCCH) are multiplexed together, a start time of the R-PDCCHs is a start time of a second slot of the base station subframe.

15. The system according to claim 7, when R-PDCCHs are separate from each other, a start time of each of the R-PDCCHs is a start time of a second slot of the base station subframe.

* * * * *